(12) United States Patent
Li et al.

(10) Patent No.: US 12,081,475 B2
(45) Date of Patent: Sep. 3, 2024

(54) TRANSMISSION MODE DETERMINING METHOD AND APPARATUS

(71) Applicant: Huawei Technologies Co., Ltd., Shenzhen (CN)

(72) Inventors: Chao Li, Beijing (CN); Zhe Liu, Shenzhen (CN); Fan Yang, Beijing (CN); Junwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 17/514,675

(22) Filed: Oct. 29, 2021

(65) Prior Publication Data

US 2022/0052815 A1 Feb. 17, 2022

Related U.S. Application Data

(63) Continuation of application No. PCT/CN2020/087581, filed on Apr. 28, 2020.

(30) Foreign Application Priority Data

Apr. 30, 2019 (CN) .......................... 201910364617.4

(51) Int. Cl.
*H04L 5/00* (2006.01)
*H04L 1/06* (2006.01)
(Continued)

(52) U.S. Cl.
CPC .......... *H04L 5/0048* (2013.01); *H04L 1/0693* (2013.01); *H04L 1/1812* (2013.01); *H04L 67/104* (2013.01); *H04W 72/542* (2023.01)

(58) Field of Classification Search
CPC ......... H04W 74/0816; H04W 72/1263; H04W 72/12; H04W 74/08; H04W 28/26;
(Continued)

(56) References Cited

U.S. PATENT DOCUMENTS

2014/0293815 A1 10/2014 Xia et al.
2015/0215903 A1* 7/2015 Zhao ..................... H04W 72/02
370/329
(Continued)

FOREIGN PATENT DOCUMENTS

CN 108024287 A 5/2018
CN 108882314 A 11/2018
(Continued)

OTHER PUBLICATIONS

3GPP TS 36.213 V15.5.0 (Mar. 2019), "3rd Generation Partnership Project; Technical Specification Group Radio Access Network; Evolved Universal Terrestrial Radio Access (E-UTRA); Physical layer procedures (Release 15)," 553 pages.
(Continued)

Primary Examiner — Jung Liu
(74) Attorney, Agent, or Firm — Slater Matsil, LLP

(57) ABSTRACT

This application relates to the communications field, and provides a transmission mode determining method and an apparatus, to better select a transmission mode and/or a transmission parameter of data autonomously. The transmission mode determining method includes: A first device measures a first resource set based on first information, to obtain a first measurement value, where the first information includes at least one of the following information: a subcarrier spacing of the first resource set, a quality of service parameter of first data, and feedback information between the first device and a second device, and the first resource set is to be used to transmit the first data. The first device determines a transmission mode of the first data based on the first measurement value, and/or determines a transmission parameter of the first data based on the first measurement value.

18 Claims, 9 Drawing Sheets

(51) Int. Cl.
*H04L 1/1812* (2023.01)
*H04L 67/104* (2022.01)
*H04W 72/542* (2023.01)

(58) Field of Classification Search
CPC ... H04W 72/04; H04W 56/001; H04W 76/28; H04W 72/02; H04W 4/40; H04W 4/44; H04W 72/53; H04W 72/23; H04W 8/005; H04W 72/0446; H04W 76/27; H04W 74/002; H04W 72/20; H04L 1/1614; H04L 5/1469; H04L 1/0061
See application file for complete search history.

(56) References Cited

U.S. PATENT DOCUMENTS

| | | | | |
|---|---|---|---|---|
| 2017/0188391 | A1* | 6/2017 | Rajagopal | H04W 74/0816 |
| 2018/0263052 | A1* | 9/2018 | Xu | H04W 72/0446 |
| 2019/0116608 | A1* | 4/2019 | Kim | H04W 72/1263 |
| 2019/0150157 | A1* | 5/2019 | Panteleev | H04W 76/14 370/329 |
| 2019/0313374 | A1* | 10/2019 | Lee | H04W 74/0816 |
| 2020/0037216 | A1* | 1/2020 | Lee | H04W 4/70 |
| 2020/0120466 | A1* | 4/2020 | Rajagopal | H04L 67/12 |
| 2023/0261926 | A1* | 8/2023 | Lincoln | H04B 7/0617 370/328 |

FOREIGN PATENT DOCUMENTS

| | | |
|---|---|---|
| CN | 108923890 A | 11/2018 |
| CN | 109600836 A | 4/2019 |
| CN | 109075910 B | 11/2020 |
| WO | 2017135803 A1 | 8/2017 |
| WO | 2018182262 A1 | 10/2018 |

OTHER PUBLICATIONS

3GPP TS 36.214 V15.3.0 (Sep. 2018), "3rd Generation Partnership Project;Technical Specification Group Radio Access Network; Evolved Universal Terrestrial Radio Access (E-UTRA); Physical layer; Measurements (Release 15)," 25 pages.
3GPP TS 36.331 V15.5.1 (Apr. 2019), "3rd Generation Partnership Project; Technical Specification Group Radio Access Network; Evolved Universal Terrestrial Radio Access (E-UTRA); Radio Resource Control (RRC); Protocol specification (Release 15)," 948 pages.
3GPP TS 38.101-1 V15.5.0 (Mar. 2019), "3rd Generation Partnership Project; Technical Specification Group Radio Access Network; NR; User Equipment (UE) radio transmission and reception; Part 1: Range 1 Standalone (Release 15)," 239 pages.
3GPP TS 38.211 V15.5.0 (Mar. 2019), "3rd Generation Partnership Project; Technical Specification Group Radio Access Network; NR; Physical channels and modulation (Release 15)," 96 pages.
3GPP TS 38.213 V15.5.0 (Mar. 2019) "3rd Generation Partnership Project; Technical Specification Group Radio Access Network; NR; Physical layer procedures for control (Release 15)," 104 pages.
3GPP TS 38.214 V15.5.0 (Mar. 2019), "3rd Generation Partnership Project; Technical Specification Group Radio Access Network; NR; Physical layer procedures for data (Release 15)," 103 pages.
3GPP TS 38.215 V15.4.0 (Dec. 2018), "3rd Generation Partnership Project; Technical Specification Group Radio Access Network; NR; Physical layer measurements (Release 15)," 15 pages.
3GPP TS 38.331 V15.4.0 (Dec. 2018), "3rd Generation Partnership Project; Technical Specification Group Radio Access Network; NR; Radio Resource Control (RRC) protocol specification (Release 15)," 474 pages.
Fraunhofer IIS, et al., "QoS Management for NR V2X, [online]," 3GPP TSG RAN WG1 #96, R1-1902104, Internet URL: http://www.3gpp.org/ftp/tsg_ran/WG1_RL1/TSGR1_96/Docs/R1-1902104.zip>, Feb. 25-Mar. 1, 2019, Athens, Greece, 6 pages.
Interdigital Communications, "MAC Layer Impact of Supporting Different Numerologies," 3GPP TSG-RAN WG1 #87, R1-1612357, Reno, Nevada, Nov. 14-18, 2016, 4 pages.
Huawei et al., "Discussion on AGC issue for NR V2X [online]," 3GPP TSG RAN WG4 Meeting #90bis, R4-1903177, Internet URL:https://www.3gpp.org/ftp/tsg_ran/WG4_Radio/TSGR4_90Bis/Docs/R4-1903177 .zip>, Xi'an, China, Apr. 8-12, 2018, 4 pages.
Intel Corporation, "Design of physical layer procedures for NR V2X sidelink communication [online]," 3GPP TSG RAN WG1 #96bis, R1-1904299, Internet URL:https://www.3gpp.org/ftp/tsg_ran/WG1_RL1/TSGR1_96b/Docs/R1-1904299.zip>, Xi'an, China, Apr. 8-12, 2019, 13 pages.
Oppo, "Discussion on MAC for NR-V2X [online]," 3GPP TSG-RAN WG2 Meeting #105bis, R2-1903216, Internet URL:https://www.3gpp.org/ftp/tsg_ran/WG2_RL2/TSGR2_105bis/Docs/R2-1903216.zip>, Xi'an, China, Apr. 8-Apr. 12, 2019, 9 pages.
Fujitsu, "Discussion on Basic Resource Allocation Methods for NR-V2X Sidelink Communication [online]," 3GPP TSG RAN WG1 #96, R1-1901946, Internet URL:http://www.3gpp.org/ftp/tsg_ran/WG1_RL1/TSGR1_96/Docs/R1-1901946.zip>, Athens, Greece, Feb. 25-Mar. 1, 2019, 16 pages.
Intel Corporation, "Resource Selection Latency Reduction for LTE V2V Sidelink Communication [online]," 3GPP TSG RAN WG1 Meeting #92bis, R1-1804691, Internet URL:http://www.3gpp.org/ftp/tsg_ran/WG1_RL1/TSGR1_92b/Docs/R1-1804691.zip>, Sanya, China, Apr. 16-20, 2018, 7 pages.
NTT Docomo, Inc., "NR Sidelink Physical Layer Procedure[ online]," 3GPP TSG RAN WG1 #96bis, R1-1905425, Internet URL:https://www.3gpp.org/ftp/tsg_ran/WG1_RL1/TSGR1_96b/Docs/R1-1905425.zip>, Xi'an, China, Apr. 8-12, 2019, 10 pages.
NTT Docomo, Inc., "Sidelink physical layer structure for NR V2X [online]," 3GPP TSG RAN WG1 #96, R1-1902798, Internet URL:http://www.3gpp.org/ftp/tsg_ran/WG1_RL1/TSGR1_96/Docs/R1-1902798.zip, Athens, Greece, Feb. 25-Mar. 1, 2019, 10 pages.
Intel Corporation, "Sidelink Physical Structure for NR V2X Communication," [online], 3GPP TSG RAN WG1 #96bis R1-1904294, Apr. 8-12, 2019, Internet URL:https://www.3gpp.org/ftp/tsg_ran/WG1_RL1/TSGR1_96b/Docs/R1-1904294.zip, Apr. 3, 2019, 18 pages.

\* cited by examiner

A

B

C

D

TRANSMISSION MODE DETERMINING METHOD AND APPARATUS

CROSS-REFERENCE TO RELATED APPLICATIONS

This application is a continuation of International Application No. PCT/CN2020/087581, filed on Apr. 28, 2020, which claims priority to Chinese Patent Application No. 201910364617.4, filed on Apr. 30, 2019. The disclosures of the aforementioned applications are hereby incorporated by reference in their entireties.

TECHNICAL FIELD

This application relates to the communications field, and in particular, to a transmission mode determining method and an apparatus.

BACKGROUND

Device-to-device (D2D) communication, vehicle-to-vehicle (V2V) communication, vehicle-to-pedestrian (V2P) communication, vehicle-to-infrastructure (V2I) communication, or vehicle-to-network (V2I/N) communication is a technology for direct communication between terminal devices. V2V, V2P, V2I, and V2N are collectively referred to as vehicle-to-everything V2X (V2X) communication, namely, communication between a vehicle and everything.

During V2X communication, a terminal device can perform communication based on a transmission mode and a transmission parameter that are autonomously selected by the terminal device. However, if different terminal devices preempt resources based on transmission modes and transmission parameters that are autonomously selected by the terminal devices, a conflict between transmission resources may occur in a scenario in which there are a relatively large quantity of users or a relatively small quantity of spectrum resources.

SUMMARY

Embodiments of this application provide a transmission mode determining method and an apparatus, to better select a transmission mode and/or a transmission parameter of data autonomously.

To achieve the foregoing objective, the following technical solutions are used in the embodiments of this application.

According to a first aspect, a transmission mode determining method is provided. The method includes: A first device measures a first resource set based on first information, to obtain a first measurement value, where the first information includes at least one of the following information: a subcarrier spacing of the first resource set, a quality of service parameter of first data, and feedback information between the first device and a second device, and the first resource set is to be used to transmit the first data. The first device determines a transmission mode of the first data based on the first measurement value, and/or determines a transmission parameter of the first data based on the first measurement value. According to the transmission mode determining method provided in this embodiment of this application, the resource set is measured based on the first information, to obtain the measurement value, and the transmission mode and/or the transmission parameter of the data are/is determined based on the measurement value. Because information such as the subcarrier spacing of the first resource set, the quality of service parameter of the first data, and the feedback information between the first device and the second device in a data transmission process is considered in the first information, the transmission mode and/or the transmission parameter of the data are/is better selected autonomously.

In a possible implementation, the method further includes: The first device sends the first data to the second device based on the transmission mode and/or the transmission parameter.

In a possible implementation, the first data includes at least one of the following data: sidelink data, sidelink control information, and sidelink feedback information.

In a possible implementation, the first measurement value includes at least one of the following measurement values: received signal strength indicator information, a reference signal received power, a channel busy ratio, and a channel occupancy ratio.

In a possible implementation, the quality of service parameter of the first data includes at least one of the following information: a service type of the first data, priority information of the first data, a latency parameter of the first data, a packet error rate of the first data, a packet size of the first data, and a minimum communication distance of the first data, where the service type of the first data is a periodic service or an aperiodic service.

In a possible implementation, the subcarrier spacing of the first resource set includes any one of the following subcarrier spacings: 15 kHz, 30 kHz, 60 kHz, 120 kHz, and 240 kHz. The subcarrier spacing of the first resource set may be used to determine a start symbol and an end symbol of a measurement window.

In a possible implementation, the feedback information includes: channel state information CSI feedback information and/or hybrid automatic repeat request HARQ acknowledgment information that are/is received by the first device from the second device, or CSI feedback information and/or HARQ acknowledgment information that are/is sent by the first device to the second device.

In a possible implementation, that a first device measures a first resource set based on first information, to obtain a first measurement value includes: The first device determines a size of the measurement window based on the first information, and/or determines the start symbol and the end symbol of the measurement window based on the first information, where the size of the measurement window is a quantity of time domain resources and/or frequency domain resources used when the first device measures the first resource set in the measurement window. The first device measures the first resource set in the measurement window based on the size, the start symbol, and the end symbol of the measurement window, to obtain the first measurement value.

In a possible implementation, the time domain resource includes a slot and/or a symbol in the first resource set, and the frequency domain resource includes a resource block and/or a sub-channel.

In a possible implementation, the measurement window includes a first measurement window and a second measurement window, and the first information includes the quality of service parameter. If the quality of service parameter is a priority of the first data, data with a higher priority corresponds to the first measurement window, and data with a lower priority corresponds to the second measurement window. Alternatively, if the quality of service parameter is the latency parameter of the first data, data with a higher latency corresponds to the first measurement window, and data with a lower latency corresponds to the second measurement window. Alternatively, if the quality of service parameter is the packet error rate of the first data, data with a higher packet error rate corresponds to the first measurement window, and data with a lower packet error rate corresponds to the second measurement window. Alternatively, if the quality of service parameter is the service type of the first data, data of the periodic service corresponds to the first measurement window, and data of the aperiodic service corresponds to the second measurement window. The first data may correspond to different measurement windows based on different types of values of the quality of service parameter.

In a possible implementation, the first measurement window and the second measurement window occupy different resources in time domain, or the first measurement window occupies more time domain resources than the second measurement window, or the first measurement window and the second measurement window may partially or completely overlap in time domain.

In a possible implementation, the first measurement window and the second measurement window are associated with corresponding measurement thresholds.

In a possible implementation, the first information includes the subcarrier spacing of the first resource set. If the subcarrier spacing of the first resource set is 15 kHz or 30 kHz, the start symbol is the second symbol in a slot, and the end symbol is the last but one symbol in the slot. Alternatively, if the subcarrier spacing of the first resource set is 60 kHz, the start symbol is the third symbol in a slot, and the end symbol is the last but one symbol in the slot. Alternatively, if the subcarrier spacing of the first resource set is 120 kHz, the start symbol is the fifth symbol in a slot, and the end symbol is the last but one symbol in the slot.

In a possible implementation, the slot is each slot for transmitting the first data, or the first slot in K consecutive slots, where K is an integer greater than 1.

In a possible implementation, that a first device measures a first resource set based on first information, to obtain a first measurement value includes: The first device measures the first resource set based on the first information, to obtain a second measurement value and a third measurement value. The first device obtains the first measurement value based on the second measurement value and the third measurement value.

In a possible implementation, the first measurement value is the channel occupancy ratio, the first resource set includes a second resource set and a third resource set, the second measurement value is a quantity of occupied sub-channels, and the third measurement value is a quantity of to-be-sent sub-channels. That the first device measures the first resource set based on the first information, to obtain a second measurement value and a third measurement value includes: The first device measures the second resource set based on the first information to obtain the quantity of occupied sub-channels, and determines, based on the first information, the quantity of to-be-sent sub-channels in the third resource set. That the first device obtains the first measurement value based on the second measurement value and the third measurement value includes: The first device obtains the channel occupancy ratio based on the quantity of occupied sub-channels and the quantity of to-be-sent sub-channels.

In a possible implementation, the quantity of to-be-sent sub-channels includes at least one of the following information: a retransmission resource corresponding to a negative acknowledgment detected by the first device; a retransmission resource corresponding to a negative acknowledgment generated by the first device; and a reserved resource indicated in control information detected by the first device.

In a possible implementation, that the first device determines a transmission parameter of the first data based on the first measurement value includes: The first device obtains first configuration information. The first device determines the transmission parameter of the first data based on the first configuration information and the first measurement value. The first configuration information includes a value set that is of the first measurement value and that corresponds to the quality of service parameter, and at least one of the following transmission parameters associated with the quality of service parameter: a modulation and coding scheme, a quantity of transmissions of a transport block, a quantity of feedback resources, a quantity of resources for a data channel, a maximum transmit power, a latency, a transmission distance, a data packet size, and a packet error rate.

In a possible implementation, that the first device determines a transmission mode of the first data based on the first measurement value includes: If the first measurement value meets a preset condition, the first device discards the first data, or the first device switches the first data from transmission with a HARQ feedback to transmission with a preset quantity of transmissions, or the first device discards the first data with no HARQ feedback, or the first device discards the first data that has a lowest priority and that is in HARQ transmission, or the first device discards the first data whose transmission distance exceeds a transmission distance threshold, or the first device discards the first data whose transmission latency exceeds a transmission latency threshold. In this implementation, communication quality over a network can be improved, and the transmission mode can be better selected.

In a possible implementation, that the first measurement value meets a preset condition includes: One or more of the first measurement values are greater than a preset threshold.

In a possible implementation, the preset threshold is determined based on at least one type of the first information. Alternatively, preset thresholds are respectively configured for transmission of the first data with a HARQ acknowledgment and transmission of the first data with no HARQ feedback.

In a possible implementation, the first resource set corresponds to at least one of the following channels: a data channel, a control channel, and a feedback channel.

In a possible implementation, measurement thresholds are respectively configured for different channels.

In a possible implementation, the control channel is located within a time-frequency resource of a slot in which the data channel is located, and the method further includes: When measuring a resource corresponding to the data channel, the first device skips measuring a resource corresponding to the control channel; or when measuring a resource corresponding to the data channel, the first device simultaneously measures a resource corresponding to the control channel and the resource corresponding to the data channel.

In a possible implementation, the feedback channel is located within the time-frequency resource of the slot in which the data channel is located, and the method further includes: When measuring the resource corresponding to the data channel, the first device skips measuring a resource corresponding to the feedback channel; or when measuring the resource corresponding to the data channel, the first device simultaneously measures a resource corresponding to the feedback channel and the resource corresponding to the data channel.

In a possible implementation, when measuring a resource corresponding to the feedback channel, the first device measures only the resource corresponding to the feedback channel, and the resource corresponding to the feedback channel is located on last M symbols in every N slots in the first resource set, where M and N are positive integers.

In a possible implementation, the method further includes: When the first device measures the resource corresponding to the feedback channel, a measured time domain resource does not include first K symbols in the M symbols, where a value of K is determined based on the subcarrier spacing, and K is a positive integer.

In a possible implementation, preset thresholds are respectively configured for a feedback channel for feeding back only a negative acknowledgment and a feedback channel for feeding back a acknowledgment or a negative acknowledgment.

In a possible implementation, the method further includes: The first device sends the first measurement value to a network device. The network device may adjust a time-frequency resource for data transmission based on the first measurement value.

According to a second aspect, a communications apparatus is provided. The communications apparatus includes: a transceiver module, configured to measure a first resource set based on first information, to obtain a first measurement value, where the first information includes at least one of the following information: a subcarrier spacing of the first resource set, a quality of service parameter of first data, and feedback information between a first device and a second device, and the first resource set is to be used to transmit the first data; and a processing module, configured to determine a transmission mode of the first data based on the first measurement value, and/or determine, by the first device, a transmission parameter of the first data based on the first measurement value.

In a possible implementation, the transceiver module is further configured to send the first data to the second device based on the transmission mode and/or the transmission parameter.

In a possible implementation, the first data includes at least one of the following data: sidelink data, sidelink control information, and sidelink feedback information.

In a possible implementation, the first measurement value includes at least one of the following measurement values: received signal strength indicator information, a reference signal received power, a channel busy ratio, and a channel occupancy ratio.

In a possible implementation, the quality of service parameter of the first data includes at least one of the following information: a service type of the first data, priority information of the first data, a latency parameter of the first data, a packet error rate of the first data, a packet size of the first data, and a minimum communication distance of the first data, where the service type of the first data is a periodic service or an aperiodic service.

In a possible implementation, the subcarrier spacing of the first resource set includes any one of the following subcarrier spacings: 15 kHz, 30 kHz, 60 kHz, 120 kHz, and 240 kHz.

In a possible implementation, the feedback information includes: channel state information CSI feedback information and/or hybrid automatic repeat request HARQ acknowledgment information that are/is received by the first device from the second device, or CSI feedback information and/or HARQ acknowledgment information that are/is sent by the first device to the second device.

In a possible implementation, the processing module is specifically configured to determine a size of a measurement window based on the first information, and/or determine a start symbol and an end symbol of the measurement window based on the first information, where the size of the measurement window is a quantity of time domain resources and/or frequency domain resources used when the first device measures the first resource set in the measurement window. The transceiver module is specifically configured to measure the first resource set in the measurement window based on the size, the start symbol, and the end symbol of the measurement window, to obtain the first measurement value.

In a possible implementation, the time domain resource includes a slot and/or a symbol in the first resource set, and the frequency domain resource includes a resource block and/or a sub-channel.

In a possible implementation, the measurement window includes a first measurement window and a second measurement window, and the first information includes the quality of service parameter. If the quality of service parameter is a priority of the first data, data with a higher priority corresponds to the first measurement window, and data with a lower priority corresponds to the second measurement window. Alternatively, if the quality of service parameter is the latency parameter of the first data, data with a higher latency corresponds to the first measurement window, and data with a lower latency corresponds to the second measurement window. Alternatively, if the quality of service parameter is the packet error rate of the first data, data with a higher packet error rate corresponds to the first measurement window, and data with a lower packet error rate corresponds to the second measurement window. Alternatively, if the quality of service parameter is the service type of the first data, data of the periodic service corresponds to the first measurement window, and data of the aperiodic service corresponds to the second measurement window.

In a possible implementation, the first measurement window and the second measurement window occupy different resources in time domain, or the first measurement window occupies more time domain resources than the second measurement window, or the first measurement window and the second measurement window may partially or completely overlap in time domain.

In a possible implementation, the first measurement window and the second measurement window are associated with corresponding measurement thresholds.

In a possible implementation, the first information includes the subcarrier spacing of the first resource set. If the subcarrier spacing of the first resource set is 15 kHz or 30 kHz, the start symbol is the second symbol in a slot, and the end symbol is the last but one symbol in the slot. Alternatively, if the subcarrier spacing of the first resource set is 60 kHz, the start symbol is the third symbol in a slot, and the end symbol is the last but one symbol in the slot. Alternatively, if the subcarrier spacing of the first resource set is 120 kHz, the start symbol is the fifth symbol in a slot, and the end symbol is the last but one symbol in the slot.

In a possible implementation, the slot is each slot for transmitting the first data, or the first slot in K consecutive slots, where K is an integer greater than 1.

In a possible implementation, the transceiver module is specifically configured to measure the first resource set based on the first information, to obtain a second measurement value and a third measurement value. The processing module is specifically configured to obtain the first measurement value based on the second measurement value and the third measurement value.

In a possible implementation, the first measurement value is the channel occupancy ratio, the first resource set includes a second resource set and a third resource set, the second measurement value is a quantity of occupied sub-channels, and the third measurement value is a quantity of to-be-sent sub-channels. The transceiver module is specifically configured to measure the second resource set based on the first information to obtain the quantity of occupied sub-channels. The processing module is specifically configured to determine, based on the first information, the quantity of to-be-sent sub-channels in the third resource set. The processing module is specifically configured to obtain the channel occupancy ratio based on the quantity of occupied sub-channels and the quantity of to-be-sent sub-channels.

In a possible implementation, the quantity of to-be-sent sub-channels includes at least one of the following information: a retransmission resource corresponding to a negative acknowledgment detected by the first device; a retransmission resource corresponding to a negative acknowledgment generated by the first device; and a reserved resource indicated in control information detected by the first device.

In a possible implementation, the transceiver module is specifically configured to obtain first configuration information. The processing module is specifically configured to determine the transmission parameter of the first data based on the first configuration information and the first measurement value. The first configuration information includes a value set that is of the first measurement value and that corresponds to the quality of service parameter, and at least one of the following transmission parameters associated with the quality of service parameter: a modulation and coding scheme, a quantity of transmissions of a transport block, a quantity of feedback resources, a quantity of resources for a data channel, a maximum transmit power, a latency, a transmission distance, a data packet size, and a packet error rate.

In a possible implementation, the processing module is specifically configured to: if the first measurement value meets a preset condition, discard the first data, or switch the first data from transmission with a HARQ feedback to transmission with a preset quantity of transmissions, or discard the first data with no HARQ feedback, or discard the first data that has a lowest priority and that is in HARQ transmission, or discard the first data whose transmission distance exceeds a transmission distance threshold, or discard the first data whose transmission latency exceeds a transmission latency threshold.

In a possible implementation, that the first measurement value meets a preset condition includes: One or more of the first measurement values are greater than a preset threshold.

In a possible implementation, the preset threshold is determined based on at least one type of the first information. Alternatively, preset thresholds are respectively configured for transmission of the first data with a HARQ acknowledgment and transmission of the first data with no HARQ feedback.

In a possible implementation, the first resource set corresponds to at least one of the following channels: a data channel, a control channel, and a feedback channel.

In a possible implementation, measurement thresholds are respectively configured for different channels.

In a possible implementation, the control channel is located within a time-frequency resource of a slot in which the data channel is located. When a resource corresponding to the data channel is measured, a resource corresponding to the control channel is not measured; or when a resource corresponding to the data channel is measured, a resource corresponding to the control channel and the resource corresponding to the data channel are simultaneously measured.

In a possible implementation, the feedback channel is located within the time-frequency resource of the slot in which the data channel is located. When the resource corresponding to the data channel is measured, a resource corresponding to the feedback channel is not measured; or when the resource corresponding to the data channel is measured, a resource corresponding to the feedback channel and the resource corresponding to the data channel are simultaneously measured.

In a possible implementation, when a resource corresponding to the feedback channel is measured, only the resource corresponding to the feedback channel is measured, and the resource corresponding to the feedback channel is located on last M symbols in every N slots in the first resource set, where M and N are positive integers.

In a possible implementation, when the resource corresponding to the feedback channel is measured, a measured time domain resource does not include first K symbols in the M symbols, where a value of K is determined based on the subcarrier spacing, and K is a positive integer.

In a possible implementation, preset thresholds are respectively configured for a feedback channel for feeding back only a negative acknowledgment and a feedback channel for feeding back a acknowledgment or a negative acknowledgment.

In a possible implementation, the transceiver module is further configured to send the first measurement value to a network device.

According to a third aspect, a communications apparatus is provided. The communications apparatus includes a processor and a memory. The memory is configured to store a program, and the processor invokes the program stored in the memory, to enable the communications apparatus to perform the method according to any one of the first aspect and the implementations of the first aspect.

According to a fourth aspect, a computer-readable storage medium is provided. The computer-readable storage medium stores instructions. When the instructions are run on a computer or a processor, the computer or the processor is enabled to perform the method according to any one of the first aspect and the possible implementations of the first aspect.

According to a fifth aspect, a computer program product including instructions is provided. When the instructions are run on a computer or a processor, the computer or the processor is enabled to perform the method according to any one of the first aspect and the possible implementations of the first aspect.

According to a sixth aspect, a communications system is provided. The communications system includes at least two communications apparatuses according to the second aspect, or includes at least two communications apparatuses according to the third aspect.

For technical effects of the second aspect to the sixth aspect, refer to the content described in various possible implementations of the first aspect.

DETAILED DESCRIPTION OF ILLUSTRATIVE EMBODIMENTS

In embodiments of this application, a V2X scenario of a 5th generation (5G) communications network in wireless communications networks is used for description. It should be noted that solutions in the embodiments of this application may be further applied to another wireless communications network, and a corresponding name may alternatively be replaced with a name of a corresponding function in the another wireless communications network.

The embodiments of this application may be applied to a long term evolution (LTE) system, for example, a narrowband internet of things (NB-IoT) system, or may be applied to a long term evolution-advanced (LTE advanced, LTE-A) system. The embodiments of this application may also be applied to another wireless communications system, for example, a global system for mobile communications (GSM), a mobile communications system (UMTS), a code division multiple access (CDMA) system, and a new network device system.

Figure 1:
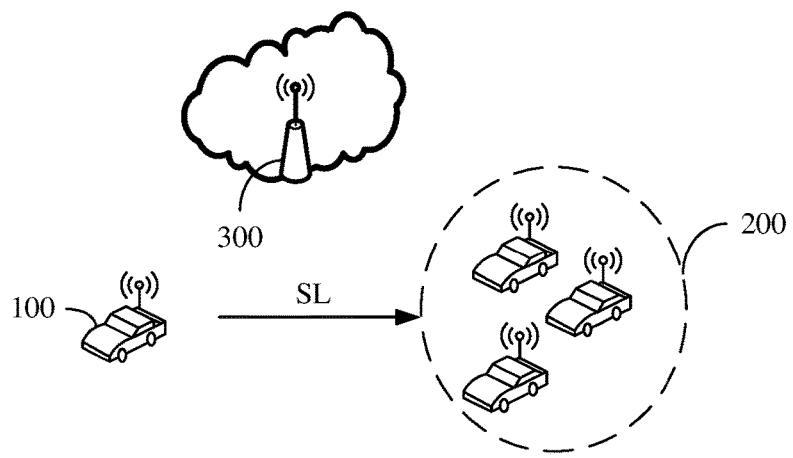
FIG. 1 is a schematic architectural diagram of a communications system according to an embodiment of this application.

The embodiments of this application provide a transmission mode determining method, and the method is applied to a V2X communications system shown in FIG. 1. As shown in FIG. 1, the V2X communications system provided in the embodiments of this application includes a first device 100 and a second device 200, and may further include a network device 300. The first device 100 and the second device 200 communicate with each other over a sidelink (SL). The sidelink is a secondary link in a V2X network. The V2X network further includes an uplink and a downlink in addition to the secondary link.

For example, V2X communication includes V2V communication, V2I communication, V2P communication, and V2N communication. V2V communication between the first device 100 and the second device 200 that are both vehicles is merely used as an example in FIG. 1. A specific V2X communication scenario is not limited in the embodiments of this application. For example, the first device and the second device in this application each may be a vehicle-mounted module, a vehicle-mounted module, a vehicle-mounted component, an automotive chip, or an on-board unit that is built as one or more components or units in a vehicle. The vehicle may implement the method in this application by using the vehicle-mounted module, the vehicle-mounted module, the vehicle-mounted component, the automotive chip, or the on-board unit that is built in the vehicle. Communication between the first device 100 and the second device 200 may be communication between vehicle-mounted devices, communication between a road side unit (RSU) and a vehicle-mounted device and/or a network device (for example, a base station device), communication between the network device 300 and a vehicle-mounted device and/or an RSU, or the like. The network device 300 may be an LTE base station device, an NR base station device, or a network base station that is in a subsequent evolved system and that provides radio access. It may be understood that specific forms of the first device 100, the second device 200, and the network device 300 are not limited in the embodiments of this application, and the descriptions herein are merely examples.

It may be understood that the communication method provided in this application is not only applicable to the sidelink shown in FIG. 1, but also applicable to a cellular link. A scenario to which the communication method is applicable is not limited in the embodiments of this application, and the descriptions herein are merely examples. The first device and the second device in the embodiments of this application are communications apparatuses, and the communications apparatus may be a terminal device, or may be a network device. When the first device is a network device, the sidelink may be a link between base stations, for example, a link between macro base stations, a link between a macro base station and a small cell, a link between a master base station and a secondary base station, a link between master base stations, or a link between secondary base stations. This is not limited in the embodiments of this application.

Figure 2:
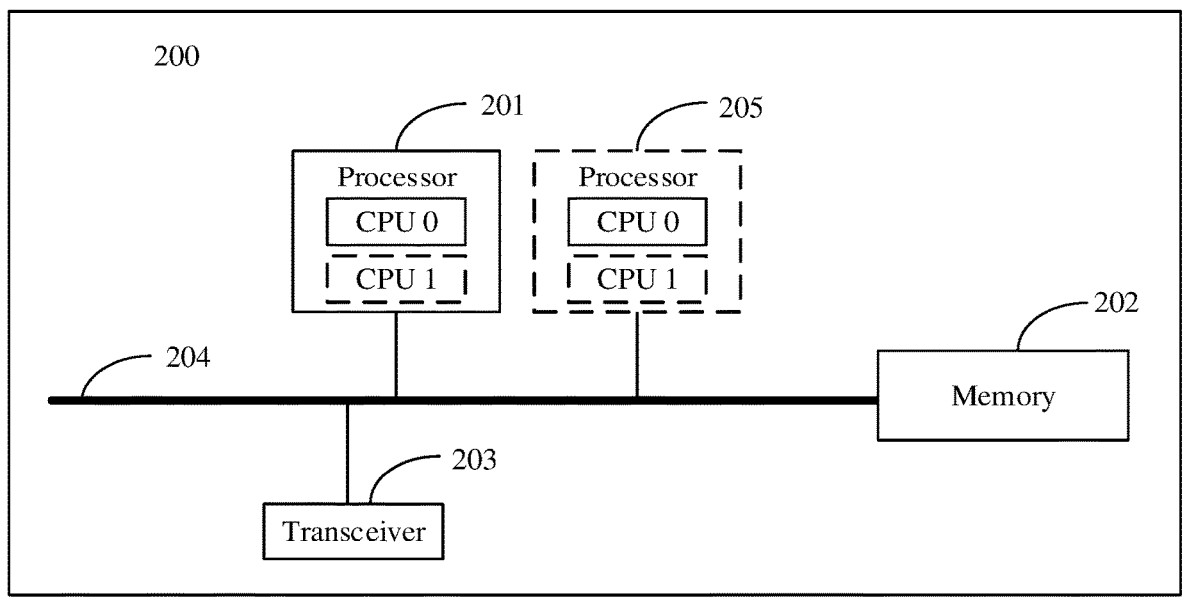
FIG. 2 is a first schematic structural diagram of a communications apparatus according to an embodiment of this application.

FIG. 2 shows a communications apparatus according to an embodiment of this application. The communications apparatus may be the first device, the second device, or the network device in this application. The communications apparatus may be a vehicle, or may be an in-vehicle communications apparatus or a vehicle-mounted terminal that is mounted on a vehicle and that is configured to assist the vehicle in driving, or may be a chip that is in an in-vehicle communications apparatus or a vehicle-mounted terminal. The vehicle-mounted terminal may be a device configured to implement a wireless communication function, for example, a terminal or a chip that can be used in a terminal. The terminal may be user equipment (UE), an access terminal, a terminal unit, a terminal station, a mobile station, a mobile station, a remote station, a remote terminal, a mobile device, a wireless communications apparatus, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self driving, a wireless terminal in remote medical surgery (remote medical), a wireless terminal in a smart grid, a wireless terminal in transportation safety, a wireless terminal in a smart city, a wireless terminal in a smart home, or the like. The vehicle-mounted terminal may be movable or fixed.

As shown in FIG. 2, the communications apparatus 200 includes at least one processor 201, a memory 202, a transceiver 203, and a communications bus 204.

The following specifically describes the components of the communications apparatus with reference to FIG. 2.

The processor 201 is a control center of the communications apparatus, and may be one processor or may be a general name of a plurality of processing elements. For example, the processor 201 is a central processing unit (CPU), or an application-specific integrated circuit (ASIC), or is configured as one or more integrated circuits for implementing the embodiments of the present invention, for example, one or more microprocessors (digital signal processor, DSP) or one or more field programmable gate arrays (FPGA).

The processor 201 may perform various functions of the communications apparatus by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communications apparatus may include a plurality of processors, for example, the processor 201 and a processor 205 shown in FIG. 2. Each of the processors may be a single-core processor (single-CPU) or may be a multi-core processor (multi-CPU). The processor herein may be one or more communications apparatuses, circuits, and/or processing cores configured to process data (for example, computer program instructions).

The memory 202 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage medium, an optical disc storage medium (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 202 may exist independently and be connected to the processor 201 via the communications bus 204. Alternatively, the memory 202 may be integrated with the processor 201.

The memory 202 is configured to store a software program for executing the solutions of the present invention, and the processor 201 controls execution.

The transceiver 203 is configured to communicate with another communications apparatus. Certainly, the transceiver 203 may be further configured to communicate with a communications network, such as the Ethernet, a radio access network (RAN), or a wireless local area network (WLAN). The transceiver 203 may include a receiving unit for implementing a receiving function and a sending unit for implementing a sending function.

The communications bus 204 may be an industry standard architecture (industry standard architecture, ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The structure that is of the communications apparatus and that is shown in FIG. 2 does not constitute a limitation on the communications apparatus. The communications apparatus may include more or fewer components than those shown in the figure, or some components may be combined, or the communications apparatus may have different component arrangement.

Based on the foregoing V2X communications system, the embodiments of this application provide the transmission mode determining method. A resource set is measured in a measurement window, to obtain a measurement value, and a transmission mode and/or a transmission parameter of data are/is determined based on the measurement value. The measurement value includes received signal strength indicator (RSSI) information, a reference signal received power (RSRP), a channel busy ratio (CBR), a channel occupancy ratio (CR), and the like.

First, some basic concepts in the embodiments of this application are described.

RSSI

Specifically, when RSSI measurement is performed on a sidelink, the RSSI may be referred to as a sidelink RSSI (S-RSSI). Optionally, the S-RSSI is defined as a linear average of all receive powers on configured sub-channels received on each symbol. For example, there are a total of 10 measurable symbols in one slot. Assuming that a bandwidth occupied by a sub-channel configured on each symbol is 20 physical resource blocks (PRB), a total power of each of the 10 symbols on the 20 PRBs is calculated, and then linear average is performed on measurement results on the 10 measurable symbols, to obtain the S-RSSI.

For another example, there are a total of 12 measurable symbols in one slot. Assuming that 10 sub-channels are configured on each symbol, a total power of each of the 12 measurable symbols on the 10 sub-channels is calculated, and then linear average is performed on measurement results on the 10 symbols, to obtain the S-RSSI.

CBR

The CBR refers to a ratio or portion of S-RSSIs that exceed a configured threshold and that are obtained through measurement in a slot n and on sub-channels in a resource pool in a slot in which a defined measurement window is located. Optionally, a size of the measurement window may be [n−a, n−b], where a and b are non-negative integers. For example, a=100, and b=1.

Optionally, for the CBR, a CBR of a corresponding channel may be obtained through measurement on different channels. For example, a CBR of a physical sidelink shared channel (PSSCH) is obtained by measuring the PSSCH. A CBR of a physical sidelink control channel (PSCCH) is obtained by measuring the PSCCH. A CBR of a physical sidelink control channel (PSFCH) is obtained by measuring the PSFCH.

For the PSSCH, assuming that in a resource pool, there are 20 sub-channels in each slot, there are a total of 100*20=2000 sub-channels in measurement windows in 100 slots (slots [n−100, n−1]) before the slot n. If it is obtained through measurement that, in the 100 slots before the slot n, RSSIs of 1200 sub-channels exceed the threshold configured by a network device, a CBR obtained through measurement in the slot n is 1200/(100*20)=0.6.

For the PSCCH, only a position that is in a resource pool of the PSCCH and that is not adjacent to the resource pool of the PSSCH in frequency domain is measured. During the measurement, a bandwidth of the PSCCH is fixed to two PRBs.

CR

The CR refers to a value obtained, in a slot n, by dividing a quantity of channels used for transmission by a total quantity of configured sub-channels. Optionally, the quantity of channels used for transmission may be a sum of a quantity of sub-channels used for transmission before the slot n and/or a quantity of sub-channels scheduled for transmission after the slot n. Correspondingly, the total quantity of configured sub-channels may be a quantity of sub-channels in a measurement window before the slot n, and may also be a quantity of sub-channels in a measurement window after the slot n. For example, the measurement window before the slot n may be [n−a, n−1], the measurement window after the slot n may be [n, n+b], and the total quantity of configured sub-channels is a total quantity of sub-channels configured in the slots [n−a, n+b].

For example, for the slot n, assuming that a total quantity of sub-channels used for transmission in the slots [n−a, n−1] is S1, a total quantity of sub-channels scheduled for transmission in the slots [n, n+b] is S2, and the total quantity of sub-channels configured in the slots [n−a, n+b] is S, the CR obtained through measurement in the slot n is (S1+S2)/S.

It should be noted that a total quantity of sub-channels scheduled for transmission in the slots [n+1, n+b] is actually sub-channels occupied by subsequent transmission, and may be counted based on a retransmission indicated by scheduling assignment (SA) indication information detected in the slot n.

For example, for the slot n, if a total quantity of sub-channels used for transmission in slots [n−500, n−1] is S1=2000, a total quantity of sub-channels scheduled for transmission in slots [n, n+499] is S2=1000, and a total quantity of sub-channels configured in the slots [n−500, n+499] is S=1000*20, the CR obtained through measurement in the slot n is (2000+1000)/20000=0.15.

Figure 3:
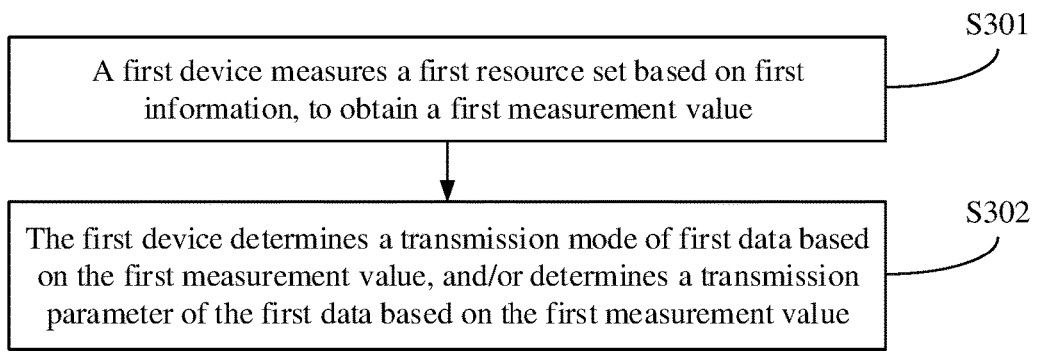
FIG. 3 is a first schematic flowchart of a transmission mode determining method according to an embodiment of this application.

Specifically, as shown in FIG. 3, this application provides a transmission mode determining method. The method includes S301 and S302.

S301: A first device measures a first resource set based on first information, to obtain a first measurement value.

The first information includes at least one of the following information: a subcarrier spacing (subcarrier spacing, SCS) of the first resource set, a quality of service (QoS) parameter of first data, and feedback information between the first device and a second device.

Optionally, a size of a slot and/or a size of a sub-channel in a measurement window and/or positions of a start symbol and an end symbol for measurement in the slot may be determined based on the subcarrier spacing of the first resource set.

Optionally, a position of the measurement window and/or a size of the measurement window may be determined based on the quality of service parameter of the first data.

Optionally, the first measurement value may be obtained based on a type of the feedback information between the first device and the second device. For example, a quantity of sub-channels occupied during transmission or scheduling may be determined based on the feedback information. The type of the feedback information includes any one of the following: feeding back only a positive acknowledgment (ACK) but not feeding back a negative acknowledgment (NACK), feeding back only a negative acknowledgment NACK but not feeding back an ACK, or feeding back an acknowledgment ACK or a negative acknowledgment NACK. The feedback information herein may be feedback information of the first device for data sent by the second device, or feedback information that is sent from the second device and that is received by the first device.

For example, when a receiver of the first device successfully obtains corresponding data through parsing, the ACK is sent to the second device; and when the receiver of the first device fails to obtain the corresponding data through parsing, neither the ACK nor the NACK is sent to the second device. Alternatively, when a receiver of the first device successfully obtains corresponding data through parsing, the ACK is not sent to the second device; and when the receiver of the first device fails to obtain the corresponding data through parsing, the NACK is sent to the second device. Alternatively, when a receiver of the first device successfully obtains corresponding data through parsing, the ACK is sent to the second device; and when the receiver of the first device fails to obtain the corresponding data through parsing, the NACK is sent to the second device.

Optionally, the first device may determine the first measurement value based on two or three of the subcarrier spacing of the first resource set, the quality of service parameter of the first data, and the feedback information between the first device and the second device. When the measurement is performed based on a plurality of types of information, corresponding aspects are respectively determined based on different information, and then the finally obtained first measurement value is determined based on the corresponding aspects. For example, the positions of the start symbol and the end symbol of the measurement window are determined based on the subcarrier spacing, the quantity of sub-channels occupied during the transmission or scheduling is determined based on the feedback information, and the position and the size of the measurement window are determined based on the quality of service parameter. Optionally, the first measurement value may be determined based on the measurement window, the symbol position during the measurement, a slot position during the measurement, a position of the sub-channel, and the quantity of sub-channels.

The first device is a transmit end of the first data, and the second device is a receive end of the first data. In other words, the first device sends the first data to the second device on the first resource set.

The first data includes at least one of the following data: sidelink data, sidelink control information, and sidelink feedback information. For example, the sidelink data may be data carried on a physical sidelink shared channel (physical sidelink shared channel, PSSCH), may be information carried on a physical sidelink control channel (PSCCH), or may be information carried on a physical sidelink control channel (PSFCH).

The quality of service parameter of the first data includes at least one of the following information: a service type of the first data, priority information of the first data, a latency parameter of the first data, a packet error rate of the first data, reliability information of the first data, a packet size of the first data, and a minimum communication distance of the first data.

Optionally, the service type is a periodic service or an aperiodic service.

Optionally, the priority information is used to indicate or determine a priority of a data packet, and a higher priority indicates that a data packet corresponding to the priority is more important or more urgent.

Optionally, the latency parameter is a maximum latency required during transmission of the data packet. For example, some data packets are required to arrive at a receiver within 3 ms, some data packets are required to arrive at a receiver within 10 ms, and some data packets are required to arrive at a receiver within 50 ms. A smaller maximum end-to-end latency indicated by the latency parameter indicates that a to-be-sent data packet is more urgent or needs to be sent, received, and processed more quickly.

Optionally, the packet error rate is a rate at which the data packet is incorrectly received. A higher packet error rate indicates that more mechanisms, for example, a plurality of retransmissions, are required during transmission to ensure correct receiving of the data packet.

Optionally, the reliability information indicates a reliability requirement of the data packet. Optionally, if the reliability requirement is higher, for example, reliability is required to reach 99.99%, more mechanisms are required during transmission to ensure correct receiving of the data packet, for example, a feedback from a physical layer is required, or more retransmissions are required. If the reliability requirement is lower, for example, reliability is required to reach 90%, a feedback may not be required during transmission, and a quantity of retransmissions may not need to be very large.

Optionally, the packet size may alternatively be a required transmission rate. Optionally, a larger value of the packet size indicates a larger size of a packet to be transmitted or a larger amount of information to be transmitted. Otherwise, a smaller value of the packet size indicates a smaller size of a packet to be transmitted or a smaller amount of information to be transmitted.

Optionally, the minimum communication distance may alternatively be a required minimum communication distance or a minimum required communication distance, and is a minimum distance required to achieve a specific transmission latency, specific transmission reliability, or a specific transmission rate. Optionally, when a distance between transceivers is less than or equal to the required minimum distance, communication between the transceivers needs to meet the requirements on the transmission latency, reliability, rate, and the like. When a distance between transceivers is greater than or equal to the required minimum distance, communication between the transceivers does not need to meet the requirements on the transmission latency, reliability, rate, and the like.

The feedback information between the first device and the second device includes: channel state information (CSI) feedback information and/or hybrid automatic repeat request (HARQ) acknowledgment information that are/is received by the first device from the second device, or CSI feedback information and/or HARQ acknowledgment information that are/is sent by the first device to the second device. Optionally, CSI includes one or more of a precoding matrix indication (PMI), a rank indication (RI), a channel quality indicator (CQI), and the like.

The first resource set is one or more resource pools that are configured by using signaling or are predefined and that are used for sidelink transmission, and a transmission resource for the first data is determined in the first resource set. The resource pool herein is a set of a time domain resource and a frequency domain resource. For example, one resource pool includes a slot used for sidelink transmission and a frequency domain resource that is in a specific position and that has a specific size in the slot.

The subcarrier spacing of the first resource set includes any one of the following subcarrier spacings: 15 kHz, 30 kHz, 60 kHz, 120 kHz, and 240 kHz. It should be noted that the foregoing subcarrier spacings are merely examples for description, and this application is not limited to being applied only to the foregoing subcarrier spacings. In this embodiment of this application, the subcarrier spacing of the first resource set may be used to determine the start symbol and the end symbol of the measurement window for the measurement of the first resource set. For details, refer to the following descriptions.

The first resource set may correspond to at least one of the following channels: a data channel, a control channel, and a feedback channel. In other words, the first resource set may be used to transmit at least one of the foregoing channels. For example, the data channel may be the PSSCH, the control channel may be the PSCCH, and the feedback channel may be the physical sidelink feedback channel (PSFCH).

Optionally, the first device measures, based on the first information, a first resource set corresponding to the data channel, to obtain a first measurement value of the data channel; and/or the first device measures, based on the first information, a first resource set corresponding to the control channel, to obtain a first measurement value of the control channel; and/or the first device measures, based on the first information, a first resource set corresponding to the feedback channel, to obtain a first measurement value of the feedback channel.

It should be noted that the first device measures the first resource set based on the first information, and measurement thresholds may be respectively configured for different channels. A reason is as follows: Amounts of data transmitted on different channels are different. Consequently, service load in corresponding measurement windows or on corresponding measurement resources is different, and results or reference points of measurement values are different. For example, S-RSSI measurement thresholds are respectively configured for the data channel and the feedback channel. Assuming that a first S-RSSI measurement threshold is configured for the data channel, and a second S-RSSI measurement threshold is configured for the feedback channel, when a CBR of the data channel is calculated, an RSSI of a sub-channel of the data channel is compared with the first RSSI measurement threshold; and when a CBR of the feedback channel is calculated, an RSSI of a sub-channel of the feedback channel is compared with the second RSSI measurement threshold.

Particularly, preset thresholds, for example, preset thresholds for measuring the CBR, are respectively configured for a feedback channel for feeding back only a negative acknowledgment NACK and a feedback channel for feeding back a acknowledgment ACK or a negative acknowledgment NACK. For related descriptions of the feeding back only the negative acknowledgment NACK and the feeding back the acknowledgment ACK or the negative acknowledgment NACK, refer to step S301. Details are not described herein again.

Figure 4:
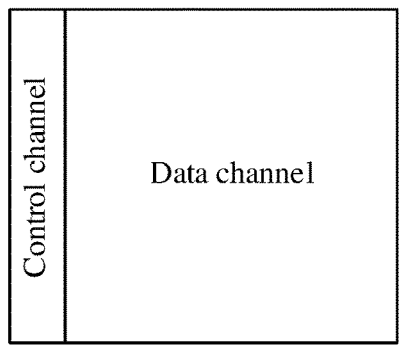
FIG. 4 is a schematic diagram of different manners of multiplexing a control channel and a data channel according to an embodiment of this application.
Figure 4:
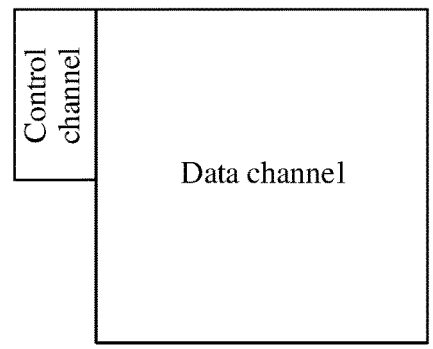
Figure 4:
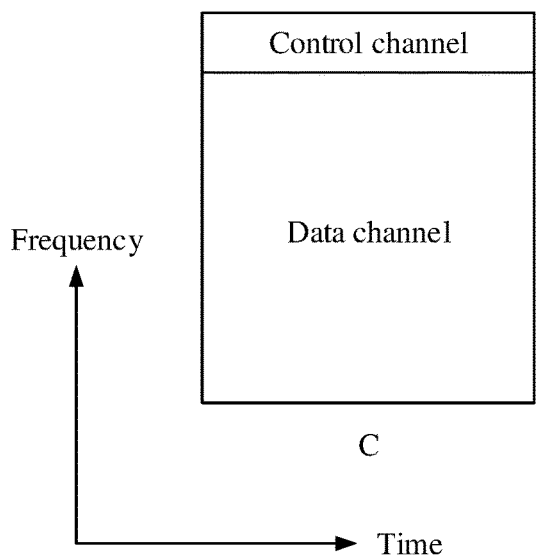
Figure 4:
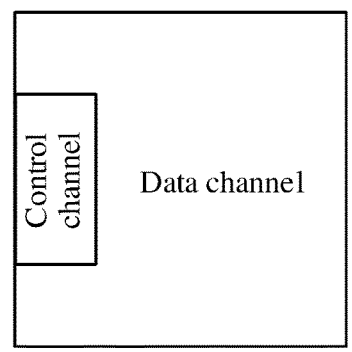

In addition, the data channel may be multiplexed with the control channel or the feedback channel in different multiplexing manners, and the corresponding multiplexing manners are described as follows: FIG. 4 shows different manners of multiplexing the control channel and the data channel. In FIG. 4, A is a multiplexing manner of an option 1A (Option 1A), B is a multiplexing manner of an option 1B (Option 1B), C is a multiplexing manner of an option 2 (Option 2), and D is a multiplexing manner of an option 3 (Option 3). Optionally, the multiplexing manners 1A and 1B may be considered as multiplexing manners of time division multiplexing between the control channel and the data channel. The multiplexing manner C may be considered as a multiplexing manner of frequency division multiplexing between the control channel and the data channel. The multiplexing manner D may be considered as a multiplexing manner in which the control channel is embedded into a resource on which the data channel is located.

In the multiplexing manner shown in D in FIG. 4, the control channel is located within a time-frequency resource of a slot in which the data channel is located. When measuring a resource corresponding to the data channel, the first device may not measure a resource corresponding to the control channel. Alternatively, when measuring a resource corresponding to the data channel, the first device simultaneously measures a resource corresponding to the control channel and the resource corresponding to the data channel.

Figure 5:
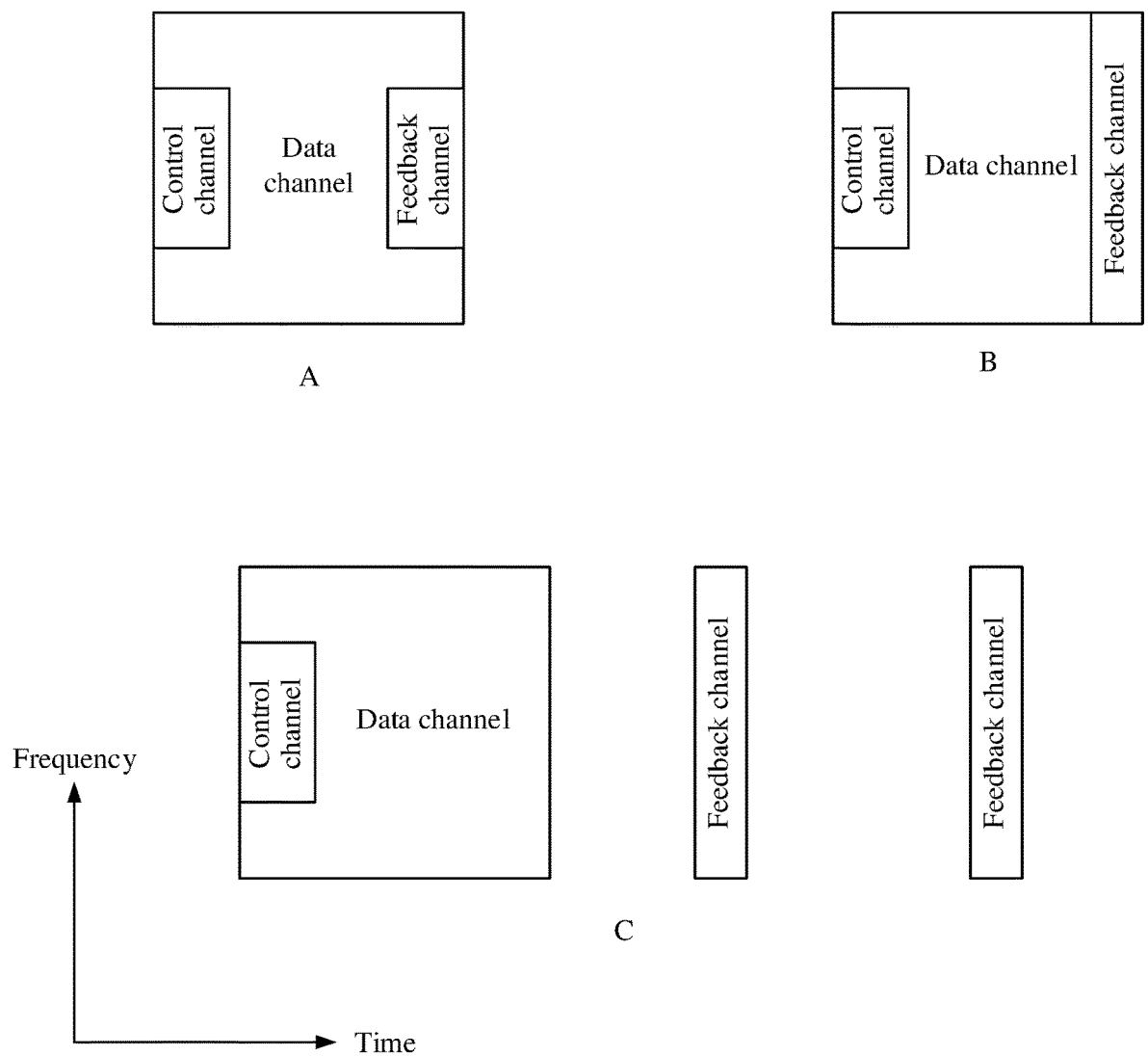
FIG. 5 is a schematic diagram of different manners of multiplexing a control channel and a feedback channel according to an embodiment of this application.

FIG. 5 shows different manners of multiplexing the feedback channel and the data channel. As shown in A in FIG. 5, a resource corresponding to the feedback channel is located on last M symbols in every N slots in the first resource set, and occupies a part of sub-channels or PRBs of the data channel. As shown in B in FIG. 5, a resource corresponding to the feedback channel is located on last M symbols in every N slots in the first resource set, and occupies all sub-channels or PRBs of the data channel. In addition, a bandwidth that is of the feedback channel and that is configured in the resource pool may be the same as or different from a bandwidth of the data channel, and a bandwidth of the feedback channel used when a terminal device sends data may be the same as or different from a bandwidth of the data channel. As shown in C in FIG. 5, a difference from B in FIG. 5 lies in that there is no data channel or control channel in a slot in which the feedback channel is located. Optionally, both N and M herein are configured by a network device or preconfigured according to a protocol.

In a multiplexing manner shown in B in FIG. 5, when the feedback channel is located within a time-frequency resource of a slot in which the data channel is located, and when the first device measures a resource corresponding to the data channel, the first device does not measure the resource corresponding to the feedback channel; or when the first device measures a resource corresponding to the data channel, the first device simultaneously measures the resource corresponding to the feedback channel and the resource corresponding to the data channel.

Optionally, when measuring the resource corresponding to the feedback channel, the first device measures only the resource corresponding to the feedback channel, and the resource corresponding to the feedback channel is located on the last M symbols in every N slots in the first resource set, where M and N are positive integers. Further, when the feedback channel is located within the time-frequency resource of the slot in which the data channel is located, and when the first device measures the resource corresponding to the feedback channel, the first device does not measure the resource corresponding to the data channel. Optionally, both N and M herein are configured by the network device or preconfigured according to the protocol.

Optionally, when the first device measures the resource corresponding to the feedback channel, a measured time domain resource does not include first K symbols in the M symbols, where a value of K is determined based on the subcarrier spacing, and K is a positive integer. For example, for the subcarrier spacings of 15 kHz and 30 kHz, K=1, that is, the first symbol in the M symbols is not measured. For another example, for the subcarrier spacing of 60 kHz, K=2, that is, the first two symbols in the M symbols are not measured. For another example, for the subcarrier spacing of 120 kHz, K=4, that is, the first four symbols in the M symbols are not measured. Optionally, the last symbol in the M symbols is not measured. Optionally, a value of M needs to be greater than a quantity of unmeasured symbols. A reason is as follows: The first K unmeasured symbols are used to perform automatic gain control (AGC), and quantities of symbols occupied for different subcarrier spacings are different.

The first measurement value may include received signal strength indicator (RSSI) information, a reference signal received power (RSRP), a channel busy ratio (CBR), and a channel occupancy ratio (CR). For a basic meaning of the first measurement value, refer to the foregoing descriptions.

Figure 6:
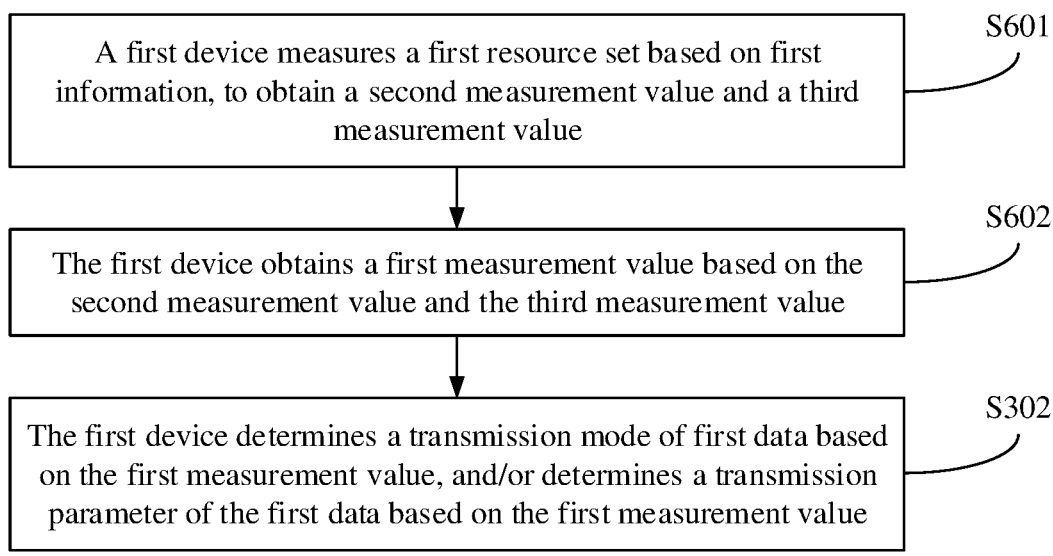
FIG. 6 is a second schematic flowchart of a transmission mode determining method according to an embodiment of this application.

In this embodiment of this application, a manner of calculating the first measurement value is improved. Details are as follows:

Optionally, as shown in FIG. 6, step S301 may include the following sub-steps.

S601: The first device measures the first resource set based on the first information, to obtain a second measurement value and a third measurement value.

The first resource set includes a second resource set and a third resource set, the second resource set is used to obtain the second measurement value, and the third resource set is used to obtain the third measurement value.

In an implementation, the first measurement value is the CR, the second measurement value is a quantity of occupied sub-channels, and the third measurement value is a quantity of to-be-sent sub-channels.

The quantity of to-be-sent sub-channels includes at least one of the following information: a retransmission resource corresponding to a negative acknowledgment NACK detected by the first device; a retransmission resource corresponding to a negative acknowledgment NACK generated by the first device; and a reserved resource indicated in control information detected by the first device.

Optionally, the retransmission resource corresponding to the negative acknowledgment NACK detected by the first device means that the first device sends data to the second device, and the second device sends the negative acknowledgment NACK to the first device if not receiving the data, to indicate the first device to retransmit the data on the corresponding retransmission resource. The first device may determine, based on the negative acknowledgment NACK, that the first device is to retransmit the data on the corresponding retransmission resource. Therefore, a corresponding sub-channel is to be occupied.

Optionally, the retransmission resource corresponding to the negative acknowledgment NACK generated by the first device means that the second device sends data to the first device, and the first device needs to send the negative acknowledgment NACK to the second device if not receiving the data, to indicate the second device to retransmit the data on the corresponding retransmission resource. The first device may determine, based on the negative acknowledgment NACK, that the second device is to retransmit the data on the corresponding retransmission resource. Therefore, a corresponding sub-channel is occupied.

Optionally, the reserved resource indicated in the control information detected by the first device means that during the periodic service, the control information indicates the first device to periodically occupy the reserved resource.

The first device may measure the second resource set based on the first information, to obtain the quantity of occupied sub-channels, and the first device determines, based on the first information, the quantity of to-be-sent sub-channels in the third resource set.

Figure 7:
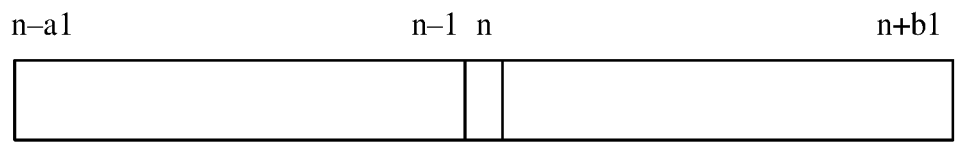
FIG. 7 is a schematic diagram of measuring a CR in a slot n according to an embodiment of this application.

For example, as shown in FIG. 7, for a CR in a slot n, the second resource set includes time-frequency resources in slots [n−a1, n−1], and the third resource set includes time-frequency resources in slots [n, n+b1]. The second measurement value is a quantity of sub-channels occupied in the slots [n−a1, n−1], and the third measurement value is a quantity of to-be-sent sub-channels in the slots [n, n+b1]. a1+b1+1=1000.

In another implementation, the first measurement value, the second measurement value, and the third measurement value are all CRs. The first device may measure the second resource set based on the first information to obtain the second measurement value, and measure the third resource set based on the first information to obtain the third measurement value. The second resource set is different from the third resource set.

For example, the second resource set includes time-frequency resources in slots [n−a1, n−1] and [n, n+b1], and the third resource set includes time-frequency resources in slots [n−a2, n−1] and [n, n+b2]. The second measurement value is a first channel occupancy ratio CR 1 that is in a slot n and that is obtained in the manner shown in FIG. 7 and based on a quantity of occupied sub-channels in the slots [n−a1, n−1] and a quantity of to-be-sent sub-channels in the slots [n, n+b1]. The third measurement value is a second channel occupancy ratio CR 2 that is in the slot n and that is obtained in the manner shown in FIG. 7 and based on a quantity of occupied sub-channels in the slots [n−a2, n−1] and a quantity of to-be-sent sub-channels in the slots [n, n+b2]. a2+b2+1<1000.

S602: The first device obtains the first measurement value based on the second measurement value and the third measurement value.

For example, in the case in which the first measurement value is the CR, the second measurement value is the quantity of occupied sub-channels, and the third measurement value is the quantity of to-be-sent sub-channels, the first device may obtain the CR based on the quantity of occupied sub-channels and the quantity of to-be-sent sub-channels. For a specific manner, refer to the descriptions of the CR in step S601. Details are not described herein again.

For example, in the case in which the first measurement value is the channel occupancy ratio CR, the second measurement value is the first channel occupancy ratio CR 1, and the third measurement value is the second channel occupancy ratio CR 2, $$CR = \alpha * CR1 + \beta CR2, \quad \text{where } \alpha + \beta = 1.$$

Optionally, the CR may be calculated by using same $\alpha$ and same $\beta$ for the periodic service and the aperiodic service. Alternatively, optionally, the CR may be calculated by using different $\alpha$ and different $\beta$ for the periodic service and the aperiodic service. For example, $\alpha1$ and $\beta1$ are used for the periodic service, and $\alpha2$ and $\beta2$ are used for the aperiodic service.

It may be understood that, although the CR is used as an example for description in the foregoing examples, this embodiment of this application is not limited thereto, and may also be applied to CBR measurement. Details are not described herein.

Figure 8:
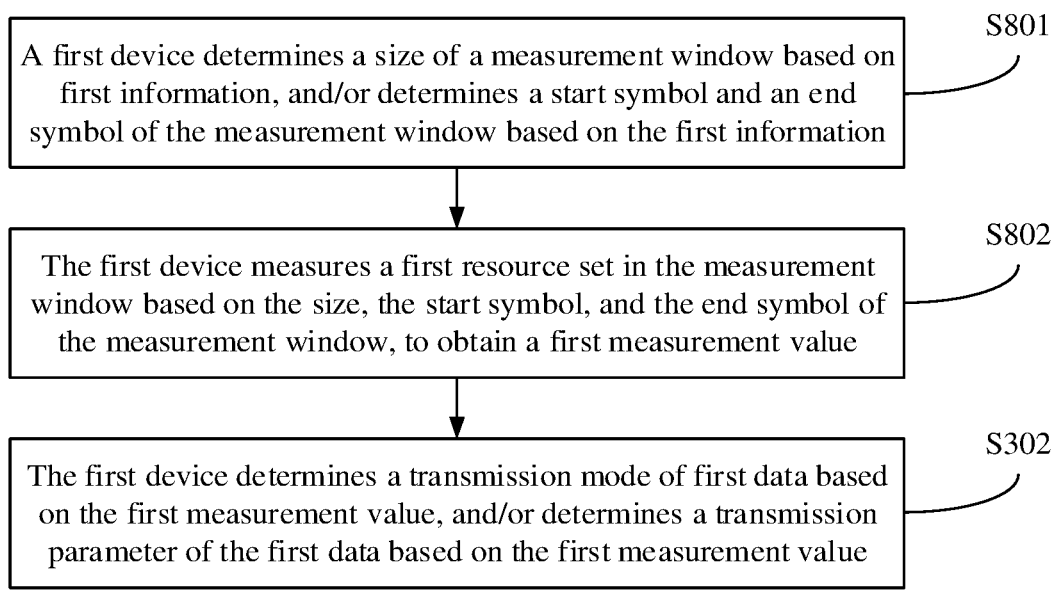
FIG. 8 is a third schematic flowchart of a transmission mode determining method according to an embodiment of this application.

In addition, in this embodiment of this application, the measurement window in a measurement process is improved. Each measurement window may be uniquely determined by using a size, a start symbol, and an end symbol. Details are as follows:

Optionally, as shown in FIG. 8, step S301 may include S801 and S802.

S801: The first device determines the size of the measurement window based on the first information, and/or determines the start symbol and the end symbol of the measurement window based on the first information.

The size of the measurement window is a quantity of time domain resources and/or frequency domain resources used when the first device measures the first resource set in the measurement window.

The time domain resource includes a slot and/or a symbol in the first resource set, and the frequency domain resource includes a resource block and/or a sub-channel.

Optionally, the measurement window may include a first measurement window and a second measurement window.

Optionally, the first measurement window and the second measurement window may occupy different resources in time domain, or the first measurement window occupies more time domain resources than the second measurement window, or the first measurement window and the second measurement window may partially or completely overlap in time domain.

When the first information includes the quality of service parameter, the first data may correspond to different measurement windows based on different types of values of the quality of service parameter.

Optionally, if the quality of service parameter is a priority of the first data, data with a higher priority corresponds to the first measurement window, and data with a lower priority corresponds to the second measurement window. For example, the data with the higher priority corresponds to a measurement window that occupies more time domain resources, so that measurement accuracy can be improved.

Alternatively, optionally, if the quality of service parameter is the latency parameter of the first data, data with a higher latency corresponds to the first measurement window, and data with a lower latency corresponds to the second measurement window. For example, the data with the higher latency corresponds to a measurement window that occupies more time domain resources, so that measurement can be more accurate, and contention, for a measurement capability and resource, with a service with a lower latency can be avoided.

Alternatively, optionally, if the quality of service parameter is the packet error rate of the first data, data with a higher packet error rate corresponds to the first measurement window, and data with a lower packet error rate corresponds to the second measurement window. For example, the data with the higher packet error rate corresponds to a measurement window that occupies more time domain resources, so that measurement accuracy can be improved, and a time-frequency resource is easy to be adjusted to decrease the packet error rate.

Alternatively, optionally, if the quality of service parameter is the service type of the first data, data of the periodic service corresponds to the first measurement window, and data of the aperiodic service corresponds to the second measurement window. For example, because the periodic service usually occupies a time-frequency resource periodically, and the aperiodic service is usually a burst service, the aperiodic service corresponds to a measurement window that occupies fewer time domain resources, to reduce measurement power consumption. In addition, long-term measurement for the aperiodic service cannot improve measurement accuracy. Optionally, the first measurement window corresponding to the data of the periodic service needs to be longer than the second measurement window corresponding to the data of the aperiodic service. Optionally, the measurement window for the aperiodic service is a subset of the measurement window for the periodic service.

Optionally, the first measurement window and the second measurement window are associated with corresponding measurement thresholds.

Figure 9:
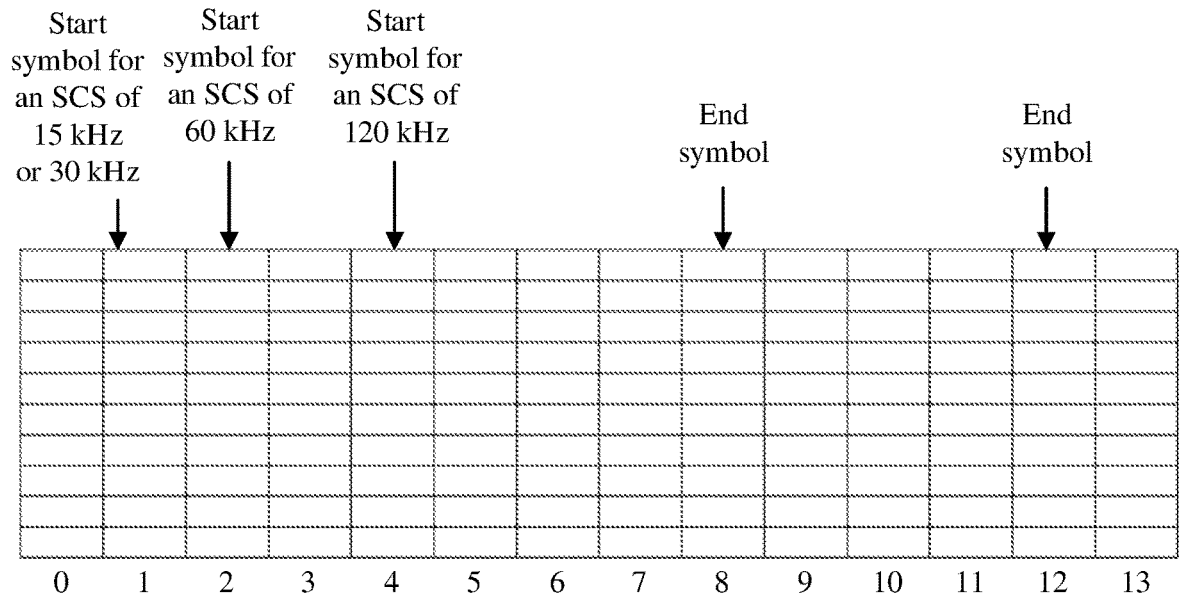
FIG. 9 is a first schematic diagram of a start symbol and an end symbol according to an embodiment of this application.

If the first information includes the subcarrier spacing of the first resource set:

As shown in FIG. 9, for a normal slot, if the subcarrier spacing of the first resource set is 15 kHz or 30 kHz, the start symbol is the second symbol in a slot, and the end symbol is the last but one symbol in the slot. Alternatively, if the subcarrier spacing of the first resource set is 60 kHz, the start symbol is the third symbol in a slot, and the end symbol is the last but one symbol in the slot. Alternatively, if the subcarrier spacing of the first resource set is 120 kHz, the start symbol is the fifth symbol in a slot, and the end symbol is the last but one symbol in the slot.

For example, the foregoing method may be applied to an automatic gain control scenario with fixed duration. For example, if duration of a signal required for performing AGC is fixed at about 35 μs, when the duration corresponds to the subcarrier spacing of 15 kHz, the duration corresponds to half a symbol, and in actual use, one symbol may be used for AGC. For another example, when AGC duration of 35 μs corresponds to the subcarrier spacings of 30 kHz, 60 kHz, 120 kHz, and 240 kHz, the duration respectively corresponds to one symbol, two symbols, four symbols, or eight symbols. Further optionally, on a sidelink, the last symbol in the slot is usually used for conversion between receiving and sending operations. Therefore, the last symbol is usually not used for measurement either.

Figure 10:
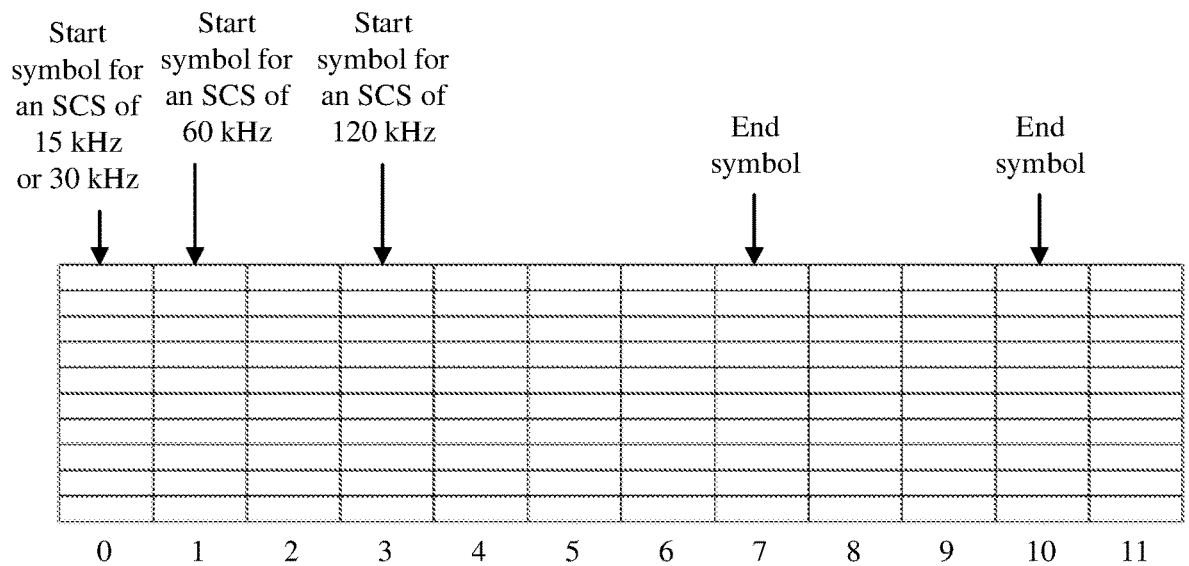
FIG. 10 is a second schematic diagram of a start symbol and an end symbol according to an embodiment of this application.

As shown in FIG. 10, for an extended slot, if the subcarrier spacing of the first resource set is 15 kHz or 30 kHz, the start symbol is the first symbol in a slot, and the end symbol is the last but one symbol in the slot. Alternatively, if the subcarrier spacing of the first resource set is 60 kHz, the start symbol is the second symbol in a slot, and the end symbol is the last but one symbol in the slot. Alternatively, if the subcarrier spacing of the first resource set is 120 kHz, the start symbol is the fourth symbol in a slot, and the end symbol is the last but one symbol in the slot.

Optionally, the slot is each slot for transmitting the first data, or the first slot in K consecutive slots, where K is an integer greater than 1. Optionally, when the slot is K consecutive slots, only first several symbols in the first slot are used to perform AGC, and symbols in a subsequent slot are not used to perform AGC.

For different subcarrier spacings, the symbols for the automatic gain control (automatic gain control, AGC) occupy same duration, but correspond to different quantities of symbols. Therefore, different subcarrier spacings correspond to different start symbols. For example, when the AGC duration is fixed at about 35 μs, one symbol, one symbol, two symbols, and four symbols are respectively occupied for the subcarrier spacings of 15 kHz, 30 kHz, 60 kHz, and 120 kHz.

Optionally, when there is no feedback channel in the slot of the data channel, the end symbol of the measurement window is the last but one symbol 12 (an extended CP is 10). When there is the feedback channel in the slot of the data channel, the end symbol of the measurement window is the last symbol on which the data is located, for example, a symbol 8 in FIG. 9 or a symbol 7 in FIG. 10.

Figure 11:
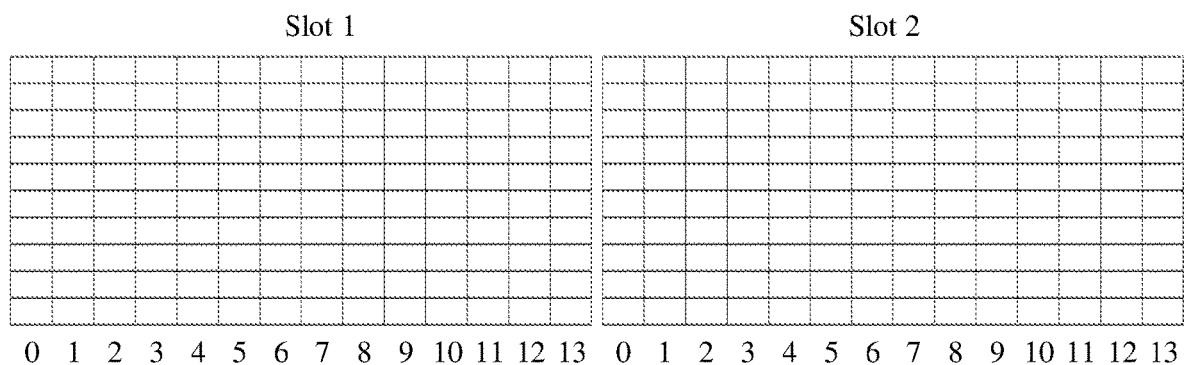
FIG. 11 is a third schematic diagram of a start symbol and an end symbol according to an embodiment of this application.

Further optionally, when aggregated transmission is performed in a plurality of slots, start symbols and end symbols of measurement windows in the slots are different. For example, as shown in FIG. 11, when aggregated transmission is performed in two slots, in a slot 1, a start symbol of a measurement window is the same as that for single-slot transmission; and an end symbol of the measurement window may be the last data symbol on which there is no feedback channel and that is in a slot 2, or the last but one symbol in a slot 2. That is, measurement needs to be performed on the start symbol to the last symbol in the slot 1, and needs to be performed on a start symbol to the end symbol in the slot 2.

S802: The first device measures the first resource set in the measurement window based on the size, the start symbol, and the end symbol of the measurement window, to obtain the first measurement value.

Specifically, the measurement window may be uniquely determined based on the size, the start symbol, and the end symbol of the measurement window.

When the measurement window includes the first measurement window and the second measurement window, the first measurement window is determined based on a size, a start symbol, and an end symbol of the first measurement window, and the second measurement window is determined based on a size, a start symbol, and an end symbol of the second measurement window.

S302: The first device determines a transmission mode of the first data based on the first measurement value, and/or determines a transmission parameter of the first data based on the first measurement value.

That the first device determines a transmission mode of the first data based on the first measurement value includes:

If the first measurement value meets a preset condition, the first device performs any one of the following transmission modes. That the first measurement value meets a preset condition includes: One or more of the first measurement values are greater than a preset threshold. The preset threshold is determined based on at least one type of the first information. Alternatively, preset thresholds are respectively configured for transmission of the first data with a HARQ acknowledgment and transmission of the first data with no HARQ feedback.

Optionally, the first device discards the first data. For example, if the CR is very high and more data cannot be carried, or communication quality is severely affected even if more data is carried, the first data may be directly discarded.

Alternatively, optionally, the first device switches the first data from transmission with a HARQ feedback to transmission with a preset quantity of transmissions. For example, because a negative acknowledgment NACK or a acknowledgment ACK occupies more time-frequency resources in a process of the transmission with a HARQ feedback, if the CR is very high, the HARQ acknowledgment transmission may be switched to the transmission with a preset quantity of transmissions, to reduce the time-frequency resources occupied by the negative acknowledgment NACK or the acknowledgment ACK.

Alternatively, optionally, the first device discards the first data with no HARQ feedback. For example, when the first measurement value meets the preset condition, the first device preferentially discards a transport block or a data packet of the first data with no HARQ feedback.

Alternatively, optionally, the first device discards the first data that has a lowest priority and that is in HARQ transmission. For example, if the CR is very high and more data cannot be carried, or communication quality is severely affected even if more data is carried, the first data that has the lowest priority and that is in HARQ transmission may be directly discarded, and a time-frequency resource is reserved for communication of data with a higher priority.

Alternatively, optionally, the first device discards the first data whose transmission distance exceeds a transmission distance threshold. For example, when a distance between the receiver of the first device and the second device exceeds a minimum distance required by a data packet to be currently transmitted by the first device, the first device discards the to-be-transmitted data packet.

Alternatively, optionally, the first device discards the first data whose transmission latency exceeds a transmission latency threshold. For example, when a minimum transmission latency requirement required by a transport block or a data packet to be transmitted by the first device cannot be met, the first device preferentially discards the data packet.

Further optionally, a joint function of the priority, the transmission latency, and the transmission distance may be defined. Correspondingly, the preset threshold may be defined as a threshold obtained by substituting a preset priority, a preset transmission latency, a preset transmission distance into the joint function. If the first measurement value meets the preset condition, the first device discards the first data that satisfies the following formula:

$$\sum_{i1 \geq k1, i2 \geq k2, i3 \geq k3} R(i1, i2, i3) \leq R(k1, k2, k3)$$

R is the joint function, k1 is the preset priority, k2 is the preset transmission latency, k3 is the preset transmission distance, i1 is the priority of the first data, i2 is the transmission latency of the first data, and i3 is the transmission distance of the first data.

It should be noted that when the network device configures the preset threshold, preset thresholds for a transmission distance within the required minimum distance and a transmission distance beyond the required minimum distance may be different. Alternatively, preset thresholds for a transmission latency meeting the latency requirement and a transmission latency not meeting the latency requirement may be different. Alternatively, preset thresholds for different priorities may be different.

Particularly, preset thresholds corresponding to blind transmission (for example, transmission without a HARQ feedback) and HARQ transmission may also be different.

According to the transmission mode determining method provided in this embodiment of this application, the resource set is measured based on the first information, to obtain the measurement value, and the transmission mode and/or the transmission parameter of the data are/is determined based on the measurement value. Because information such as the subcarrier spacing of the first resource set, the quality of service parameter of the first data, and the feedback information between the first device and the second device in a data transmission process is considered in the first information, the transmission mode and/or the transmission parameter of the data are/is better selected autonomously.

Figure 12:
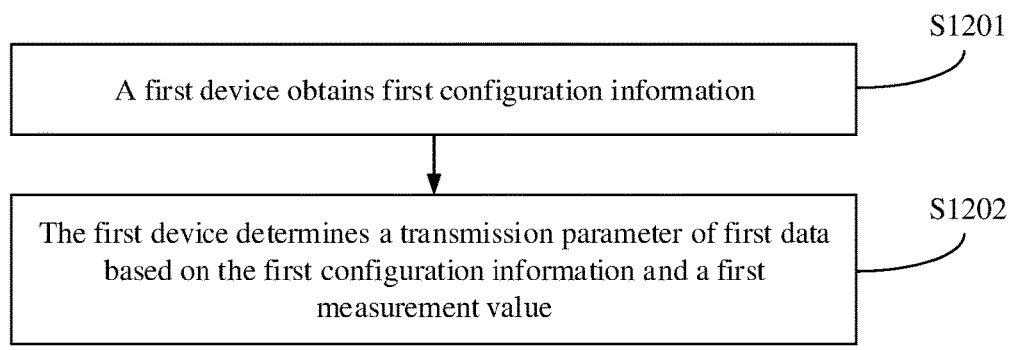
FIG. 12 is a fourth schematic flowchart of a transmission mode determining method according to an embodiment of this application.

Optionally, as shown in FIG. 12, that the first device determines a transmission parameter of the first data based on the first measurement value includes S1201 and S1202.

S1201: The first device obtains first configuration information.

Specifically, the first device may receive the first configuration information from the network device.

The first configuration information includes a value set that is of the first measurement value and that corresponds to the quality of service parameter, and at least one of the following transmission parameters associated with the quality of service parameter: a modulation and coding scheme, a quantity of transmissions of a transport block, a quantity of feedback resources, a quantity of resources for a data channel, a maximum transmit power, a latency, a transmission distance, a data packet size, and a packet error rate.

Optionally, the first configuration information may be configured by the network device or preconfigured according to a protocol. Optionally, a value of one or more quality of service parameters, for example, the priority, the minimum communication distance, and the latency requirement, may be configured in the first configuration information, and these quality of service values further correspond to a value or a value range of at least one of the foregoing transmission parameters. Optionally, the first configuration information may further correspond to the value set of the first measurement value. That is, the first configuration information is used to configure, through mutual association, the following information together: the quality of service parameter, the value set of the first measurement value, and the transmission parameter.

S1202: The first device determines the transmission parameter of the first data based on the first configuration information and the first measurement value.

Optionally, the first device determines the first measurement value and a value of the quality of service parameter of the first data sent by the first device, and then determines the value or the value range of the transmission parameter based on the two values and the obtained first configuration information. Then, the first device sends the first data of the first device based on the determined transmission parameter.

Figure 13:
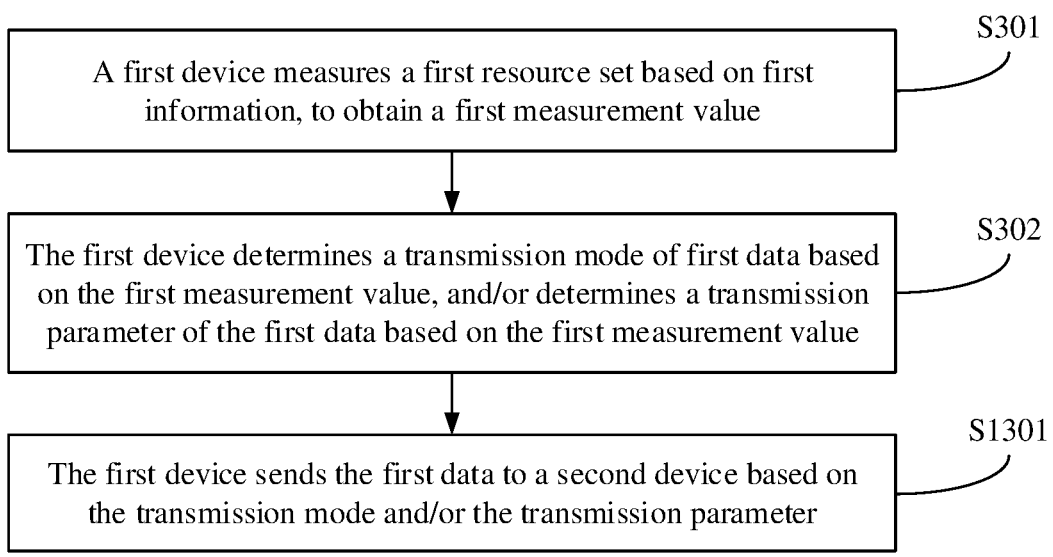
FIG. 13 is a fifth schematic flowchart of a transmission mode determining method according to an embodiment of this application.

As shown in FIG. 13, based on FIG. 3, the method may further include the following step.

S1301: The first device sends the first data to the second device based on the transmission mode and/or the transmission parameter.

Optionally, the first device determines the transmission parameter in the foregoing manner, and further determines, before sending the first data, whether the first data to be sent based on the transmission parameter needs to be discarded.

If yes, the first device directly discards the first data; otherwise, the first device sends the first data based on the determined transmission parameter.

Figure 14:
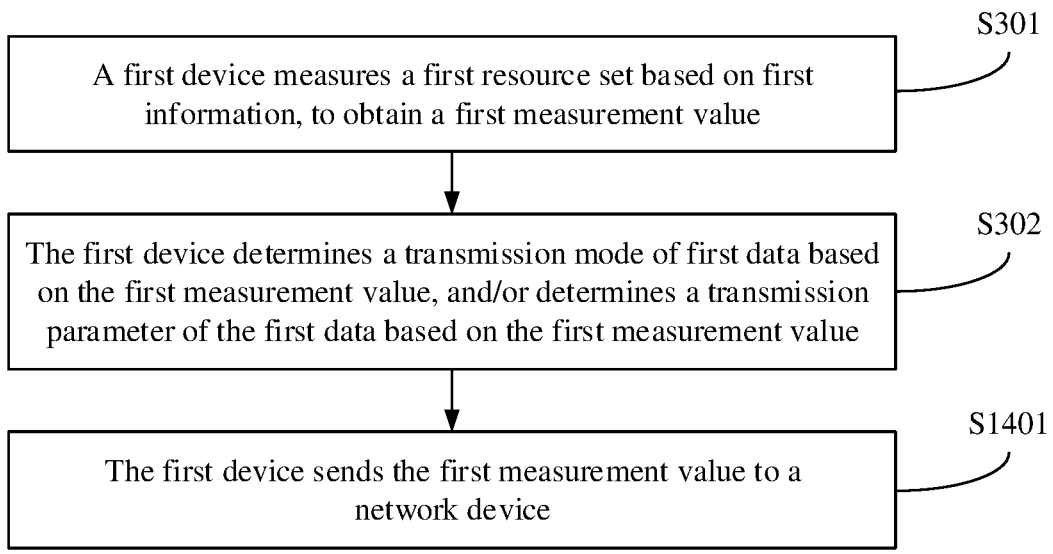
FIG. 14 is a sixth schematic flowchart of a transmission mode determining method according to an embodiment of this application.

As shown in FIG. 14, based on FIG. 3, the method may further include the following step.

S1401: The first device sends the first measurement value to the network device.

Correspondingly, the network device receives the first measurement value from the first device.

The network device may adjust a configuration of a corresponding channel resource based on the first measurement value.

For example, the first device may send a CBR of the feedback channel to the network device, and the network device may adjust a configuration of a channel resource for the feedback channel based on the CBR.

It may be understood that, in the foregoing embodiments, methods and/or steps implemented by the first device may alternatively be implemented by a component (for example, a chip or a circuit) that can be used in the first device, and methods and/or steps implemented by the network device may alternatively be implemented by a component that can be used in the network device.

The foregoing mainly describes, from the perspective of interaction between the network elements, the solutions provided in the embodiments of this application. Correspondingly, the embodiments of this application further provide a communications apparatus, and the communications apparatus is configured to implement the foregoing methods. The communications apparatus may be the first device in the foregoing method embodiments, or an apparatus including the first device, or a component that can be used in the first device. It can be understood that, to implement the foregoing functions, the communications apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, and is merely division into logical functions. In actual implementation, another division manner may be used.

The foregoing describes in detail the method provided in the embodiments of this application with reference to FIG. 3, FIG. 6, FIG. 8, and FIG. 12 to FIG. 14. The following describes in detail the communications apparatus provided in the embodiments of this application with reference to FIG. 15. It should be understood that descriptions of an apparatus embodiment mutually correspond to the descriptions of the method embodiment. Therefore, for content that is not described in detail, refer to the foregoing method embodiment. For brevity, details are not described herein again.

Figure 15:
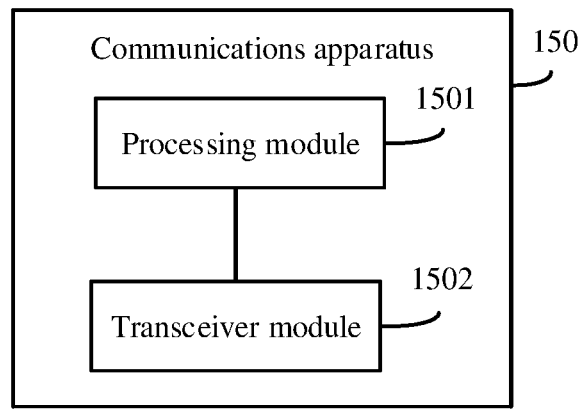
FIG. 15 is a second schematic structural diagram of a communications apparatus according to an embodiment of this application.

An embodiment of this application provides a communications apparatus. The communications apparatus may be the first device or a chip or a functional module of the first device. For example, the communications apparatus is the first device in the foregoing method embodiment. The communications apparatus may implement corresponding steps or procedures performed by the first device in the foregoing method embodiment. FIG. 15 is a schematic structural diagram of a communications apparatus 150. The communications apparatus 150 includes a processing module 1501 and a transceiver module 1502. The transceiver module 1502 may also be referred to as a transceiver unit, is configured to implement a sending and/or receiving function, and for example, may be a transceiver circuit, a transceiver, a transceiver, or a communications interface.

The transceiver module 1502 is configured to measure a first resource set based on first information, to obtain a first measurement value, where the first information includes at least one of the following information: a subcarrier spacing of the first resource set, a quality of service parameter of first data, and feedback information between a first device and a second device, and the first resource set is to be used to transmit the first data. The processing module 1501 is configured to determine a transmission mode of the first data based on the first measurement value, and/or determine, by the first device, a transmission parameter of the first data based on the first measurement value.

Optionally, the transceiver module 1502 is further configured to send the first data to the second device based on the transmission mode and/or the transmission parameter.

Optionally, the first data includes at least one of the following data: sidelink data, sidelink control information, and sidelink feedback information.

Optionally, the first measurement value includes at least one of the following measurement values: received signal strength indicator information, a reference signal received power, a channel busy ratio, and a channel occupancy ratio.

Optionally, the quality of service parameter of the first data includes at least one of the following information: a service type of the first data, priority information of the first data, a latency parameter of the first data, a packet error rate of the first data, a packet size of the first data, and a minimum communication distance of the first data, where the service type of the first data is a periodic service or an aperiodic service.

Optionally, the subcarrier spacing of the first resource set includes any one of the following subcarrier spacings: 15 kHz, 30 kHz, 60 kHz, 120 kHz, and 240 kHz.

Optionally, the feedback information includes: channel state information CSI feedback information and/or hybrid automatic repeat request HARQ acknowledgment information that are/is received by the first device from the second device, or CSI feedback information and/or HARQ acknowledgment information that are/is sent by the first device to the second device.

Optionally, the processing module 1501 is specifically configured to determine a size of a measurement window based on the first information, and/or determine a start symbol and an end symbol of the measurement window based on the first information, where the size of the measurement window is a quantity of time domain resources and/or frequency domain resources used when the first device measures the first resource set in the measurement window. The transceiver module 1502 is specifically configured to measure the first resource set in the measurement window based on the size, the start symbol, and the end symbol of the measurement window, to obtain the first measurement value.

Optionally, the time domain resource includes a slot and/or a symbol in the first resource set, and the frequency domain resource includes a resource block and/or a sub-channel.

Optionally, the measurement window includes a first measurement window and a second measurement window, and the first information includes the quality of service parameter. If the quality of service parameter is a priority of the first data, data with a higher priority corresponds to the first measurement window, and data with a lower priority corresponds to the second measurement window. Alternatively, if the quality of service parameter is the latency parameter of the first data, data with a higher latency corresponds to the first measurement window, and data with a lower latency corresponds to the second measurement window. Alternatively, if the quality of service parameter is the packet error rate of the first data, data with a higher packet error rate corresponds to the first measurement window, and data with a lower packet error rate corresponds to the second measurement window. Alternatively, if the quality of service parameter is the service type of the first data, data of the periodic service corresponds to the first measurement window, and data of the aperiodic service corresponds to the second measurement window.

Optionally, the first measurement window and the second measurement window occupy different resources in time domain, or the first measurement window occupies more time domain resources than the second measurement window, or the first measurement window and the second measurement window may partially or completely overlap in time domain.

Optionally, the first measurement window and the second measurement window are associated with corresponding measurement thresholds.

Optionally, the first information includes the subcarrier spacing of the first resource set. If the subcarrier spacing of the first resource set is 15 kHz or 30 kHz, the start symbol is the second symbol in a slot, and the end symbol is the last but one symbol in the slot. Alternatively, if the subcarrier spacing of the first resource set is 60 kHz, the start symbol is the third symbol in a slot, and the end symbol is the last but one symbol in the slot. Alternatively, if the subcarrier spacing of the first resource set is 120 kHz, the start symbol is the fifth symbol in a slot, and the end symbol is the last but one symbol in the slot.

Optionally, the slot is each slot for transmitting the first data, or the first slot in K consecutive slots, where K is an integer greater than 1.

Optionally, the transceiver module 1502 is specifically configured to measure the first resource set based on the first information, to obtain a second measurement value and a third measurement value. The processing module 1501 is specifically configured to obtain the first measurement value based on the second measurement value and the third measurement value.

Optionally, the first measurement value is the channel occupancy ratio, the first resource set includes a second resource set and a third resource set, the second measurement value is a quantity of occupied sub-channels, and the third measurement value is a quantity of to-be-sent sub-channels. The transceiver module 1502 is specifically configured to measure the second resource set based on the first information to obtain the quantity of occupied sub-channels. The processing module 1501 is specifically configured to determine, based on the first information, the quantity of to-be-sent sub-channels in the third resource set. The processing module 1501 is specifically configured to obtain the channel occupancy ratio based on the quantity of occupied sub-channels and the quantity of to-be-sent sub-channels.

Optionally, the quantity of to-be-sent sub-channels includes at least one of the following information: a retransmission resource corresponding to a negative acknowledgment detected by the first device; a retransmission resource corresponding to a negative acknowledgment generated by the first device; and a reserved resource indicated in control information detected by the first device.

Optionally, the transceiver module 1502 is specifically configured to obtain first configuration information. The processing module 1501 is specifically configured to determine the transmission parameter of the first data based on the first configuration information and the first measurement value. The first configuration information includes a value set that is of the first measurement value and that corresponds to the quality of service parameter, and at least one of the following transmission parameters associated with the quality of service parameter: a modulation and coding scheme, a quantity of transmissions of a transport block, a quantity of feedback resources, a quantity of resources for a data channel, a maximum transmit power, a latency, a transmission distance, a data packet size, and a packet error rate.

Optionally, the processing module 1501 is specifically configured to: if the first measurement value meets a preset condition, discard the first data, or switch the first data from transmission with a HARQ feedback to transmission with a preset quantity of transmissions, or discard the first data with no HARQ feedback, or discard the first data that has a lowest priority and that is in HARQ transmission, or discard the first data whose transmission distance exceeds a transmission distance threshold, or discard the first data whose transmission latency exceeds a transmission latency threshold.

Optionally, that the first measurement value meets a preset condition includes: One or more of the first measurement values are greater than a preset threshold.

Optionally, the preset threshold is determined based on at least one type of the first information. Alternatively, preset thresholds are respectively configured for transmission of the first data with a HARQ acknowledgment and transmission of the first data with no HARQ feedback.

Optionally, the first resource set corresponds to at least one of the following channels: a data channel, a control channel, and a feedback channel.

Optionally, measurement thresholds are respectively configured for different channels.

Optionally, the control channel is located within a time-frequency resource of a slot in which the data channel is located. When a resource corresponding to the data channel is measured, a resource corresponding to the control channel is not measured; or when a resource corresponding to the data channel is measured, a resource corresponding to the control channel and the resource corresponding to the data channel are simultaneously measured.

Optionally, the feedback channel is located within the time-frequency resource of the slot in which the data channel is located. When the resource corresponding to the data channel is measured, a resource corresponding to the feedback channel is not measured; or when the resource corresponding to the data channel is measured, a resource corresponding to the feedback channel and the resource corresponding to the data channel are simultaneously measured.

Optionally, when a resource corresponding to the feedback channel is measured, only the resource corresponding to the feedback channel is measured, and the resource corresponding to the feedback channel is located on last M symbols in every N slots in the first resource set, where M and N are positive integers.

Optionally, when the resource corresponding to the feedback channel is measured, a measured time domain resource does not include first K symbols in the M symbols, where a value of K is determined based on the subcarrier spacing, and K is a positive integer.

Optionally, preset thresholds are respectively configured for a feedback channel for feeding back only a negative acknowledgment and a feedback channel for feeding back a acknowledgment or a negative acknowledgment.

Optionally, the transceiver module 1502 is further configured to send the first measurement value to a network device.

All related content of the steps in the foregoing method embodiment may be cited in function descriptions of corresponding functional modules or descriptions on the foregoing method side. Details are not described herein again.

In this embodiment, the communications apparatus 150 may be presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 150 may be in a form of the communications apparatus 200 shown in FIG. 2.

For example, the processor 201 or the processor 205 in the communications apparatus 200 shown in FIG. 2 may invoke computer-executable instructions stored in the memory 202, to enable the communications apparatus 200 to perform the transmission mode determining method in the foregoing method embodiment.

Specifically, functions/implementation processes of the processing module 1501 and the transceiver module 1502 in FIG. 15 may be implemented by the processor 201 or the processor 205 in the communications apparatus 200 shown in FIG. 2 by invoking the computer-executable instructions stored in the memory 202. Alternatively, a function/an implementation process of the processing module 1501 in FIG. 15 may be implemented by the processor 201 or the processor 205 in the communications apparatus 200 shown in FIG. 2 by invoking the computer executable instructions stored in the memory 202, and a function/an implementation process of the transceiver module 1502 in FIG. 15 may be implemented by using the transceiver 203 in the communications apparatus 200 shown in FIG. 2.

Because the communications apparatus provided in this embodiment may perform the foregoing transmission mode determining method, for a technical effect that can be achieved by the communications apparatus, refer to the foregoing method embodiment. Details are not described herein again.

An embodiment of this application further provides a communications apparatus. The communications apparatus includes a processor and a memory. The memory is configured to store a program, and the processor invokes the program stored in the memory, to enable the communications apparatus to perform the transmission mode determining method that corresponds to the first device and that is in FIG. 3, FIG. 6, FIG. 8, and FIG. 12 to FIG. 14.

An embodiment of this application further provides a computer-readable storage medium. The computer-readable storage medium stores instructions. When the instructions are run on a computer or a processor, the computer or the processor is enabled to perform the transmission mode determining method that corresponds to the first device and that is in FIG. 3, FIG. 6, FIG. 8, and FIG. 12 to FIG. 14.

An embodiment of this application further provides a computer program product including instructions. When the instructions are run on a computer or a processor, the computer or the processor is enabled to perform the transmission mode determining method that corresponds to the first device and that is in FIG. 3, FIG. 6, FIG. 8, and FIG. 12 to FIG. 14.

An embodiment of this application provides a chip system. The chip system includes a processor, configured to support a communications apparatus in performing the transmission mode determining method that corresponds to the first device and that is in FIG. 3, FIG. 6, FIG. 8, and FIG. 12 to FIG. 14. For example, the first device measures a first resource set based on first information, to obtain a first measurement value, where the first information includes at least one of the following information: a subcarrier spacing of the first resource set, a quality of service parameter of first data, and feedback information between the first device and a second device, and the first resource set is to be used to transmit the first data. The first device determines a transmission mode of the first data based on the first measurement value, and/or determines a transmission parameter of the first data based on the first measurement value.

For example, the chip system may be a field programmable gate array (FPGA), an application-specific integrated circuit (ASIC), a system on chip (SoC), a central processing unit (CPU), a network processor (NP), a digital signal processor (DSP), a micro controller (MCU), a programmable logic device (PLD), or another integrated chip.

In a possible design, the chip system further includes a memory. The memory is configured to store program instructions and data that are necessary for the first device. The chip system may include a chip and an integrated circuit, or may include a chip and another discrete device. This is not specifically limited in this embodiment of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, device, and method may be implemented in other manners. For example, the described device embodiment is merely an example. For example, the division into units is merely division into logical functions and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    measuring, by a first device, a first resource set based on first information, to obtain a first measurement value, the first information comprising a subcarrier spacing of the first resource set, a quality of service parameter of first data, or feedback information between the first device and a second device, and the first resource set is to be used to transmit the first data, and wherein the first resource set corresponds to a control channel, and the control channel is located within a time-frequency resource of a slot in which a data channel is located;
    when measuring a resource corresponding to the data channel, simultaneously measuring, by the first device, a resource corresponding to the control channel and the resource corresponding to the data channel; and
    determining, by the first device, a transmission mode of the first data based on the first measurement value, or determining, by the first device, a transmission parameter of the first data based on the first measurement value.

2. The method according to claim 1, wherein the measuring, by the first device, the first resource set based on the first information, to obtain the first measurement value comprises:
    determining, by the first device, a size of a measurement window based on the first information, or determining, by the first device, a start symbol and an end symbol of the measurement window based on the first information, wherein the size of the measurement window is a quantity of time domain resources or frequency domain resources used when the first device measures the first resource set in the measurement window; and
    measuring, by the first device, the first resource set in the measurement window based on the size, the start symbol, and the end symbol of the measurement window, to obtain the first measurement value.

3. The method according to claim 1, wherein the determining, by the first device, the transmission parameter of the first data based on the first measurement value comprises:
    obtaining, by the first device, first configuration information; and
    determining, by the first device, the transmission parameter of the first data based on the first configuration information and the first measurement value, wherein the first configuration information comprises a value set that is of the first measurement value and that corresponds to the quality of service parameter, and a transmission parameter associated with the quality of service parameter, the transmission parameter comprising a modulation and coding scheme, a quantity of transmissions of a transport block, a quantity of feedback resources, a quantity of resources for the data channel, a maximum transmit power, a latency, a transmission distance, a data packet size, or a packet error rate.

4. The method according to claim 1, wherein the first resource set further corresponds to the data channel or a feedback channel.

5. The method according to claim 4, wherein the feedback channel is located within the time-frequency resource of the slot in which the data channel is located, and the method further comprises:
    when measuring the resource corresponding to the data channel, skipping measuring, by the first device, a resource corresponding to the feedback channel; or
    when measuring the resource corresponding to the data channel, simultaneously measuring, by the first device, a resource corresponding to the feedback channel and the resource corresponding to the data channel.

6. The method according to claim 1, wherein the first measurement value comprises received signal strength indicator information, a reference signal received power, a channel busy ratio, or a channel occupancy ratio.

7. The method according to claim 1, further comprising determining, by the first device, the transmission mode of the first data based on the first measurement value, and determining, by the first device, the transmission parameter of the first data based on the first measurement value, wherein the first information comprises the subcarrier spacing of the first resource set, the quality of service parameter of the first data, and the feedback information between the first device and the second device.

8. A communications apparatus, comprising:
one or more processors in communication with at least one non-transitory memory storing computer instructions, wherein computer execution of the computer instructions by the one or more processors causes the communication apparatus to:
measure a first resource set based on first information, to obtain a first measurement value, the first information comprising a subcarrier spacing of the first resource set, a quality of service parameter of first data, or feedback information between the communications apparatus and a second device, and the first resource set is to be used to transmit the first data, wherein the first resource set corresponds to a control channel, and the control channel is located within a time-frequency resource of a slot in which a data channel is located;
when measuring a resource corresponding to the data channel, simultaneously measure a resource corresponding to the control channel and the resource corresponding to the data channel; and
determine a transmission mode of the first data based on the first measurement value, or determine, by the communications apparatus, a transmission parameter of the first data based on the first measurement value.

9. The communications apparatus according to claim 8, wherein the execution of the instructions by the one or more processors causes the apparatus to:
determine a size of a measurement window based on the first information, or determine a start symbol and an end symbol of the measurement window based on the first information, wherein the size of the measurement window is a quantity of time domain resources or frequency domain resources used when the communications apparatus measures the first resource set in the measurement window; and
measure the first resource set in the measurement window based on the size, the start symbol, and the end symbol of the measurement window, to obtain the first measurement value.

10. The communications apparatus according to claim 8, wherein the execution of the instructions by the one or more processors causes the apparatus to:
obtain first configuration information; and
determine the transmission parameter of the first data based on the first configuration information, and the first measurement value, wherein
the first configuration information comprises a value set that is of the first measurement value and that corresponds to the quality of service parameter, and a transmission parameter associated with the quality of service parameter, the transmission parameter comprising a modulation and coding scheme, a quantity of transmissions of a transport block, a quantity of feedback resources, a quantity of resources for the data channel, a maximum transmit power, a latency, a transmission distance, a data packet size, or a packet error rate.

11. The communications apparatus according to claim 8, wherein the first resource set further corresponds to the data channel or a feedback channel.

12. The communications apparatus according to claim 11, wherein the feedback channel is located within the time-frequency resource of the slot in which the data channel is located; and
the execution of the instructions by the one or more processors further causes the apparatus to:
when the resource corresponding to the data channel is measured, skip measuring a resource corresponding to the feedback channel; or
when the resource corresponding to the data channel is measured, simultaneously measure a resource corresponding to the feedback channel and the resource corresponding to the data channel.

13. The communications apparatus according to claim 8, wherein the first measurement value comprises received signal strength indicator information, a reference signal received power, a channel busy ratio, or a channel occupancy ratio.

14. A non-transitory computer-readable storage medium comprising instructions which, when executed by at least one processor of an apparatus, cause the apparatus to:
measure a first resource set based on first information, to obtain a first measurement value, the first information comprising a subcarrier spacing of the first resource set, a quality of service parameter of first data, or feedback information between the apparatus and a second device, and the first resource set is to be used to transmit the first data, wherein the first resource set corresponds to a control channel, and the control channel is located within a time-frequency resource of a slot in which a data channel is located;
when measuring a resource corresponding to the data channel, simultaneously measure a resource corresponding to the control channel and the resource corresponding to the data channel; and
determine a transmission mode of the first data based on the first measurement value, or determining, by the apparatus, a transmission parameter of the first data based on the first measurement value.

15. The non-transitory computer-readable storage medium according to claim 14, wherein the instructions cause the apparatus to:
determine a size of a measurement window based on the first information, or determining, by the apparatus, a start symbol and an end symbol of the measurement window based on the first information, wherein the size of the measurement window is a quantity of time domain resources or frequency domain resources used when the apparatus measures the first resource set in the measurement window; and
measure the first resource set in the measurement window based on the size, the start symbol, and the end symbol of the measurement window, to obtain the first measurement value.

16. The non-transitory computer-readable storage medium according to claim 14, wherein the instructions cause the apparatus to:
- obtain first configuration information; and
- determine the transmission parameter of the first data based on the first configuration information, and the first measurement value, wherein
- the first configuration information comprises a value set that is of the first measurement value and that corresponds to the quality of service parameter, and a transmission parameter associated with the quality of service parameter, the transmission parameter comprising a modulation and coding scheme, a quantity of transmissions of a transport block, a quantity of feedback resources, a quantity of resources for the data channel, a maximum transmit power, a latency, a transmission distance, a data packet size, or a packet error rate.

17. The non-transitory computer-readable storage medium according to claim 14, wherein the first resource set further corresponds to the data channel or a feedback channel.

18. The non-transitory computer-readable storage medium according to claim 17, wherein the feedback channel is located within the time-frequency resource of the slot in which the data channel is located, and the instructions further cause the apparatus to:
- when measuring the resource corresponding to the data channel, skip measuring a resource corresponding to the feedback channel; or
- when measuring the resource corresponding to the data channel, simultaneously measure a resource corresponding to the feedback channel and the resource corresponding to the data channel.

\* \* \* \* \*